(12) United States Patent
Nakanishi et al.

(10) Patent No.: US 10,564,491 B2
(45) Date of Patent: *Feb. 18, 2020

(54) DISPLAY DEVICE AND ELECTRONIC APPARATUS

(71) Applicant: Japan Display Inc., Tokyo (JP)

(72) Inventors: Takayuki Nakanishi, Kanagawa (JP); Takeya Takeuchi, Kanagawa (JP)

(73) Assignee: Japan Display Inc., Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/152,258

(22) Filed: Oct. 4, 2018

(65) Prior Publication Data

US 2019/0041682 A1    Feb. 7, 2019

Related U.S. Application Data

(63) Continuation of application No. 14/920,708, filed on Oct. 22, 2015, now Pat. No. 10,126,612, which is a
(Continued)

(30) Foreign Application Priority Data

Aug. 24, 2010    (JP) .................................. 2010-187222

(51) Int. Cl.
*G02F 1/1345*    (2006.01)
*G02F 1/1343*    (2006.01)
(Continued)

(52) U.S. Cl.
CPC .... *G02F 1/13452* (2013.01); *G02F 1/133707* (2013.01); *G02F 1/134336* (2013.01);
(Continued)

(58) Field of Classification Search
CPC ........... G02F 1/134336; G02F 1/13452; G02F 1/133707; G02F 1/136286
See application file for complete search history.

(56) References Cited

U.S. PATENT DOCUMENTS 6,982,692 B2    1/2006   Kim
7,236,148 B2    6/2007   Yoshida et al.
(Continued)

FOREIGN PATENT DOCUMENTS

JP    02-111920    4/1990
JP    05-027218    2/1993
(Continued)

OTHER PUBLICATIONS

Japanese Office Action dated Sep. 10, 2013 for corresponding Japanese Application No. 2010-187222.
(Continued)

*Primary Examiner* — Dung T Nguyen
(74) *Attorney, Agent, or Firm* — Michael Best & Friedrich LLP

(57) ABSTRACT

A display device includes a plurality of signal lines that are so juxtaposed as to be extended along one direction, a plurality of common drive electrodes that are so juxtaposed as to be extended along the signal lines, and a plurality of display elements that are each connected to a respective one of the plurality of signal lines and are each connected also to the common drive electrode that makes a pair with the connected signal line. Scan driving of the plurality of display elements is performed in the direction of the signal lines.

20 Claims, 23 Drawing Sheets

Related U.S. Application Data continuation of application No. 13/067,523, filed on Jun. 7, 2011, now Pat. No. 9,214,125.

(51) Int. Cl.
  *G02F 1/1362* (2006.01)
  *G02F 1/1337* (2006.01)
  *G09G 3/36* (2006.01)
  *G09G 3/20* (2006.01)

(52) U.S. Cl.
  CPC ..... *G02F 1/136286* (2013.01); *G09G 3/3655* (2013.01); *G09G 3/2003* (2013.01); *G09G 2300/0426* (2013.01); *G09G 2320/0209* (2013.01); *G09G 2330/021* (2013.01)

(56) References Cited

U.S. PATENT DOCUMENTS

| | | | | |
|---|---|---|---|---|
| 10,126,612 | B2* | 11/2018 | Nakanishi | G09G 3/3655 |
| 2001/0040567 | A1 | 11/2001 | Kikuchi | |
| 2003/0151572 | A1 | 8/2003 | Kumada et al. | |
| 2007/0195250 | A1 | 8/2007 | Onogi et al. | |
| 2008/0231569 | A1 | 9/2008 | Yamazaki et al. | |
| 2009/0251629 | A1 | 10/2009 | Ito et al. | |

FOREIGN PATENT DOCUMENTS

| | | |
|---|---|---|
| JP | 05-094154 | 4/1993 |
| JP | 05-107555 | 4/1993 |
| JP | 10-340071 | 12/1998 |
| JP | 2000-221475 A | 8/2000 |
| JP | 2001-318391 A | 11/2001 |
| JP | 2002-277891 A | 9/2002 |
| JP | 2004-020756 A | 1/2004 |
| JP | 2005-024979 A | 1/2005 |
| JP | 2007-304342 A | 11/2007 |
| JP | 2009-251608 | 10/2009 |

OTHER PUBLICATIONS

Taiwanese Office Action dated Nov. 11, 2013 for corresponding Taiwanese Application No. 10012686.

* cited by examiner

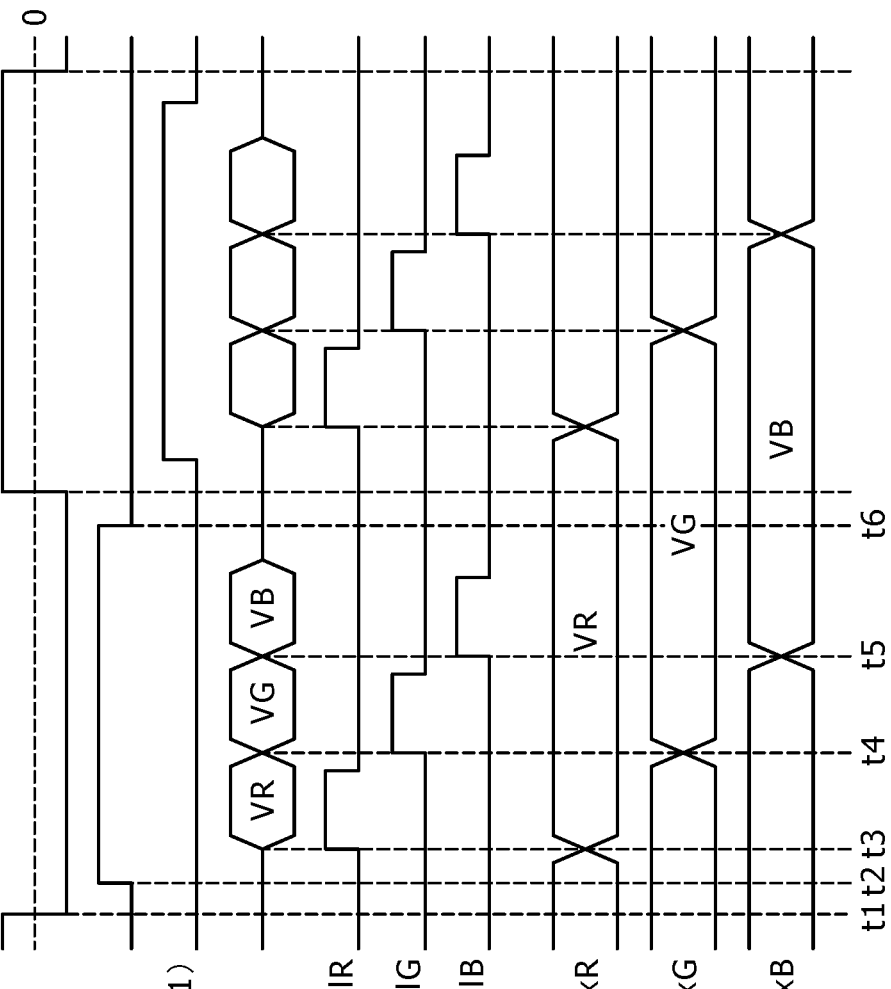

FIG.8A

| + | − | + | − |—SPix
|---|---|---|---|
| − | + | − | + |
| + | − | + | − |
| − | + | − | + |

FIG.8B

| − | + | − | + |—SPix
|---|---|---|---|
| + | − | + | − |
| − | + | − | + |
| + | − | + | − |

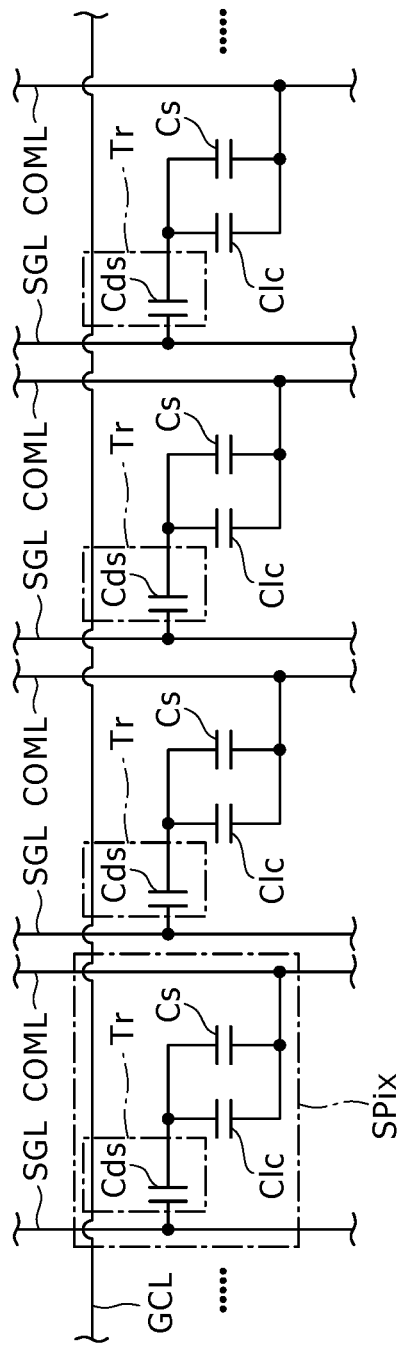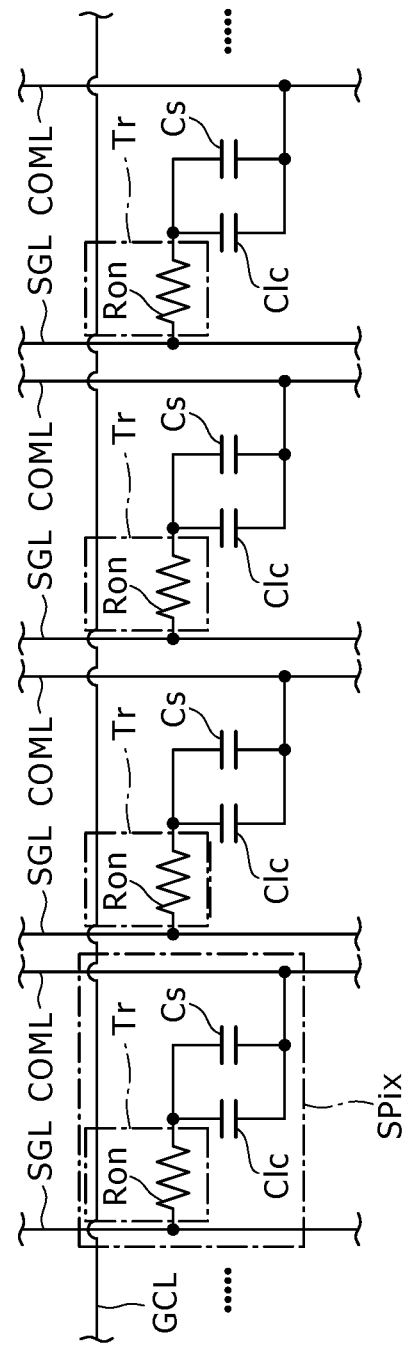
FIG.9A
FIG.9B

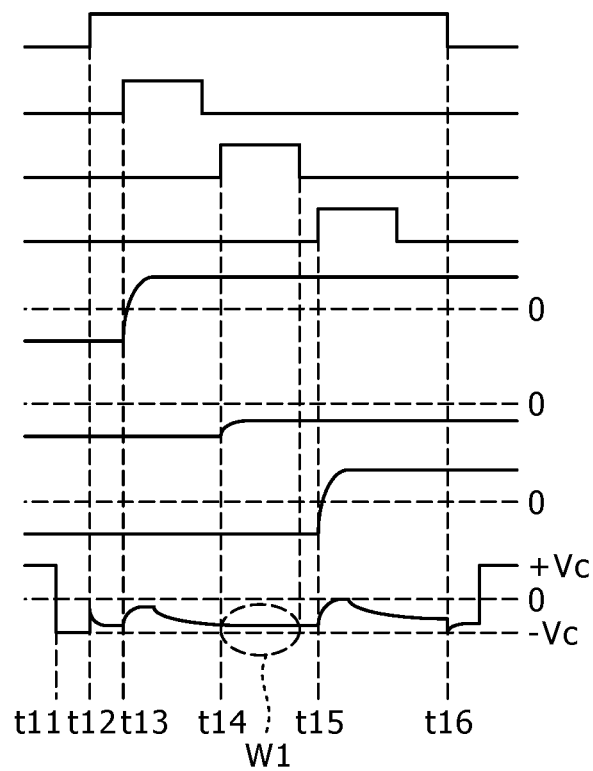

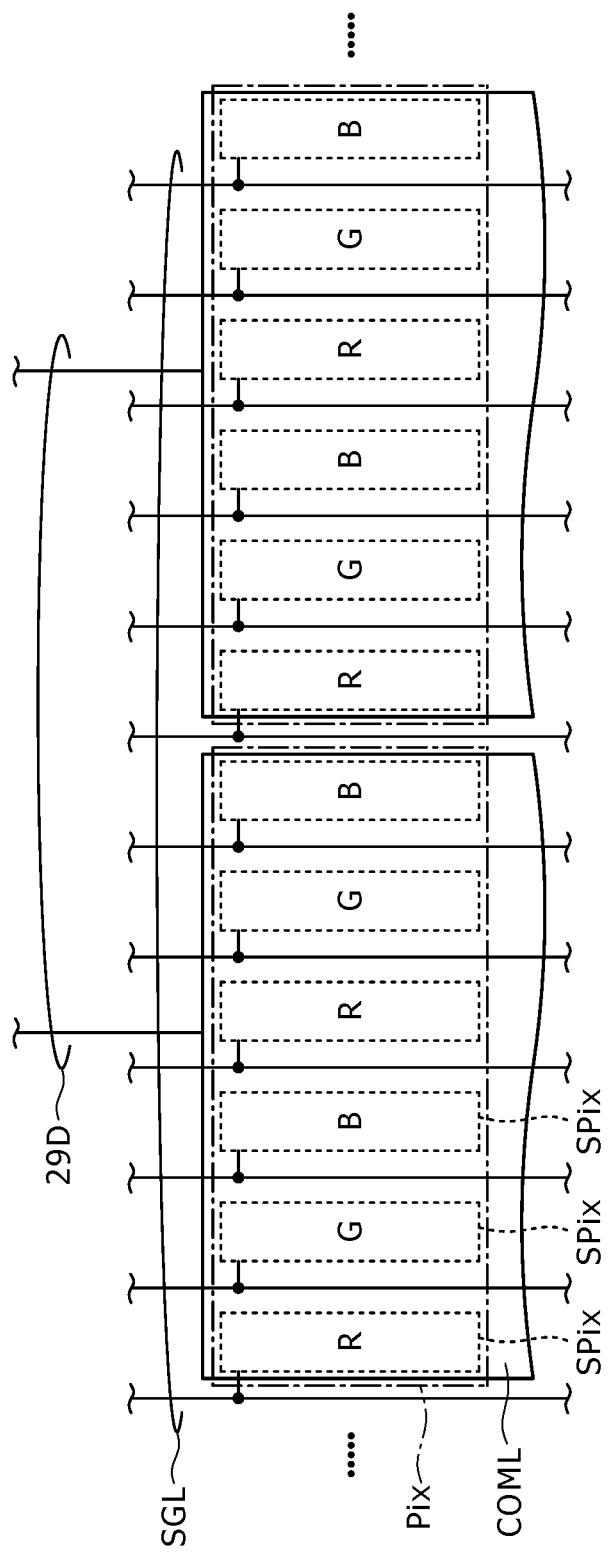

| + | + | + | + | — SPix
|---|---|---|---|
| − | − | − | − |
| + | + | + | + |
| − | − | − | − |

| − | − | − | − | — SPix
|---|---|---|---|
| + | + | + | + |
| − | − | − | − |
| + | + | + | + |

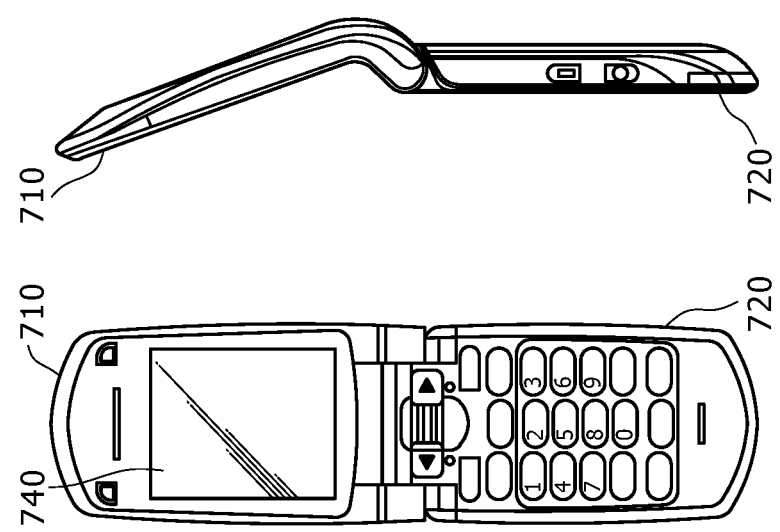
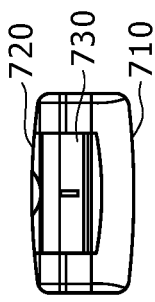
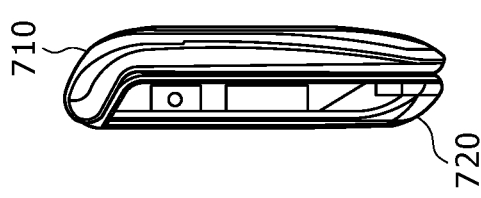
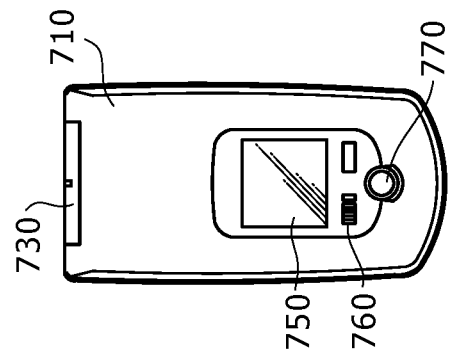
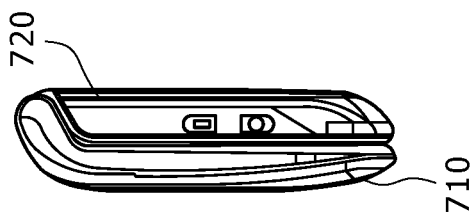

DISPLAY DEVICE AND ELECTRONIC APPARATUS

CROSS REFERENCE TO RELATED APPLICATIONS

The present application is a Continuation of application Ser. No. 14/920,708, filed Oct. 22, 2015, which is a Continuation of application Ser. No. 13/067,523, filed Jun. 7, 2011, now U.S. Pat. No. 9,214,125, issued Dec. 15, 2015, which claims priority to patent Application JP 2010-187222 filed Aug. 24, 2010, the entire contents of which are incorporated herein by reference.

BACKGROUND

The present disclosure relates to display devices, and particularly to a display device configured with a liquid crystal display element and electronic apparatus including such a display device.

In recent years, the liquid crystal display device has become the mainstream of the display device in terms of low power consumption and space saving. Some liquid crystal display devices include a common electrode that gives a common potential to plural pixels and a pixel electrode that is so provided for each pixel as to be opposed to the common electrode with the intermediary of a liquid crystal layer, for example. In such a liquid crystal display device, for example, inversion driving is performed by applying a pixel signal to the pixel electrode and applying a rectangular wave signal to the common electrode, and displaying is performed by changing the orientation of liquid crystal molecules based on the difference between the potential of the pixel electrode and the potential of the common electrode (pixel potential).

In some of the liquid crystal display devices, ingenuity is exercised on the common electrode. For example, Japanese Patent Laid-open No. 2009-251608 proposes a liquid crystal display device including plural common electrodes that are extended along the row direction of the display surface and juxtaposed in the column direction. In this liquid crystal display device, e.g. in the case of applying a drive signal to the common electrode in order to perform inversion driving, the drive signal is applied only to the common electrode relating to the pixels in one horizontal line in which the pixel signal is written. This allows reduction in the power consumption in the driving of the common electrode.

SUMMARY

The common electrode generally should have optical transparency and is often formed by using indium tin oxide (ITO). Such a common electrode has higher resistance and larger time constant compared with the case of using a metal such as aluminum. In this case, in writing of the pixel signal to pixels, this pixel signal travels to the common electrode and writing to adjacent pixels in the same one horizontal line is disturbed, so that possibly the image quality is deteriorated due to this crosstalk.

Furthermore, the drive circuit to drive the common electrode is desired to perform driving with low output impedance for the common electrode. However, depending on the arrangement of this drive circuit, its output impedance becomes high because of e.g. a long length of a power supply line to this drive circuit, and thus possibly driving the common electrode becomes difficult and the image quality is deteriorated.

There is a need for a technique to provide a display device and electronic apparatus capable of suppressing the deterioration of the image quality attribute to the common electrode.

According to an embodiment of the present disclosure, there is provided a display device including a plurality of signal lines, a plurality of common drive electrodes, and a plurality of display elements. The plurality of signal lines are so juxtaposed as to be extended along one direction. The plurality of common drive electrodes are so juxtaposed as to be extended along the signal lines. The plurality of display elements are each connected to a respective one of the plurality of signal lines and are each connected also to the common drive electrode that makes a pair with the connected signal line. Scan driving of the plurality of display elements is performed in the direction of the signal lines.

According to another embodiment of the present disclosure, there is provided electronic apparatus including the above-described display device. Examples of the electronic apparatus include a television device, a digital camera, a personal computer, a video camcorder, and a portable terminal device typified by a cellular phone.

In the display device and the electronic apparatus of the embodiments of the present disclosure, scan driving of the display elements is performed in the direction of the signal lines. In this scan driving, to the plural display elements simultaneously driven, a signal for performing displaying is supplied from each of the signal line and the common drive electrode, which are extended along the same direction, separately.

According to further embodiment of the present disclosure, there is provided a display device including a plurality of signal lines configured to be so juxtaposed as to be extended along a first direction, a plurality of drive electrodes configured to be so juxtaposed as to be extended along the first direction, and a plurality of display elements configured to be subjected to scan driving in the first direction.

According to the display device and the electronic apparatus of the embodiments of the present disclosure, the common drive electrodes are so disposed as to be extended along the signal lines and displaying is performed by scan driving in the direction of the signal lines. Thus, the deterioration of the image quality attributed to the common electrode can be suppressed.

BRIEF DESCRIPTION OF THE DRAWINGS

FIGS. 7A to 7E are timing waveform diagrams showing one operation example of the display device shown in FIG. 1;

FIGS. 8A and 8B are schematic diagrams showing one operation example of the display device shown in FIG. 1;

FIGS. 9A and 9B are circuit diagrams for explaining the operation of the display device shown in FIG. 1;

FIGS. 12A to 12D are timing waveform diagrams showing one operation example of the display device according to the comparative example;

FIG. 17 is an explanatory diagram showing one configuration example of the drive electrode according to another modification example;

FIGS. 23A to 23G are front view, side view, top view, and bottom view showing the appearance configuration of application example 5.

DETAILED DESCRIPTION OF THE PREFERRED EMBODIMENT

An embodiment of the present disclosure will be described in detail below with reference to the drawings. The order of the description is as follows.
1. Embodiment
2. Application Examples 1. Embodiment

[Configuration Example]
(Overall Configuration Example)

Figure 1:
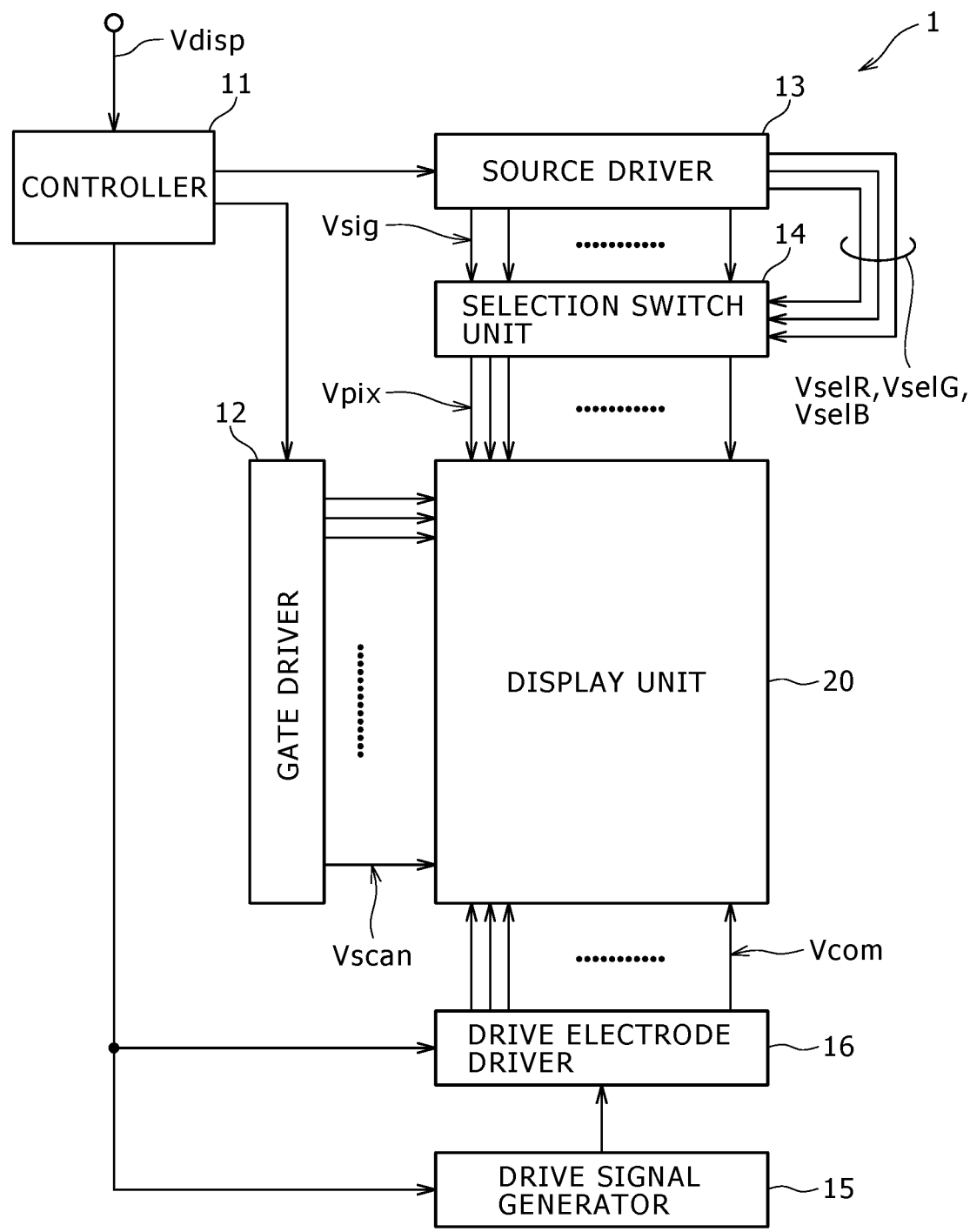
FIG. 1 is a block diagram showing one configuration example of a display device according to an embodiment of the present disclosure.

FIG. 1 shows one configuration example of a display device according to an embodiment of the present disclosure. A display device 1 is a liquid crystal display device configured with use of a liquid crystal display element as a display element. The display device 1 includes a controller 11, a gate driver 12, a source driver 13, a selection switch unit 14, a drive signal generator 15, a drive electrode driver 16, and a display unit 20.

The controller 11 is a circuit that supplies a control signal to each of the gate driver 12, the source driver 13, the drive signal generator 15, and the drive electrode driver 16 based on a video signal Vdisp supplied from the external and controls them so that they may operate in synchronization with each other. Specifically, the controller 11 supplies a display scan timing control signal to the gate driver 12 and supplies a video signal and a display timing control signal to the source driver 13. In addition, the controller 11 supplies a drive signal timing control signal to the drive signal generator 15 and the drive electrode driver 16.

The gate driver 12 has a function to sequentially select one horizontal line as the subject of display driving of the display unit 20 based on the control signal supplied from the controller 11. Specifically, as described later, the gate driver 12 applies a scan signal Vscan to the gates of TFT elements Tr in pixels Pix via a scan signal line GCL to thereby sequentially select one row (one horizontal line) of the pixels Pix formed in a matrix manner in the display unit 20 as the subject of display driving.

The source driver 13 generates and outputs a pixel signal Vsig based on the video signal and the control signal supplied from the controller 11. Specifically, as described later, the source driver 13 generates, from the video signal for one horizontal line, the pixel signal Vsig obtained by time-division multiplexing of pixel signals Vpix of plural (in this example, three) sub-pixels SPix of the display unit 20 and supplies the pixel signal Vsig to the selection switch unit 14. Furthermore, the source driver 13 generates switch control signals VselR, VselG, and VselB used to separate the pixel signals Vpix multiplexed into the pixel signal Vsig and supplies these signals to the selection switch unit 14 together with the pixel signal Vsig. This multiplexing is carried out to reduce the number of interconnects between the source driver 13 and the selection switch unit 14.

The selection switch unit 14 separates the pixel signals Vpix subjected to the time-division multiplexing into the pixel signal Vsig based on the pixel signal Vsig and the switch control signals VselR, VselG, and VselB supplied from the source driver 13, and supplies the pixel signals Vpix to the display unit 20.

Figure 2:
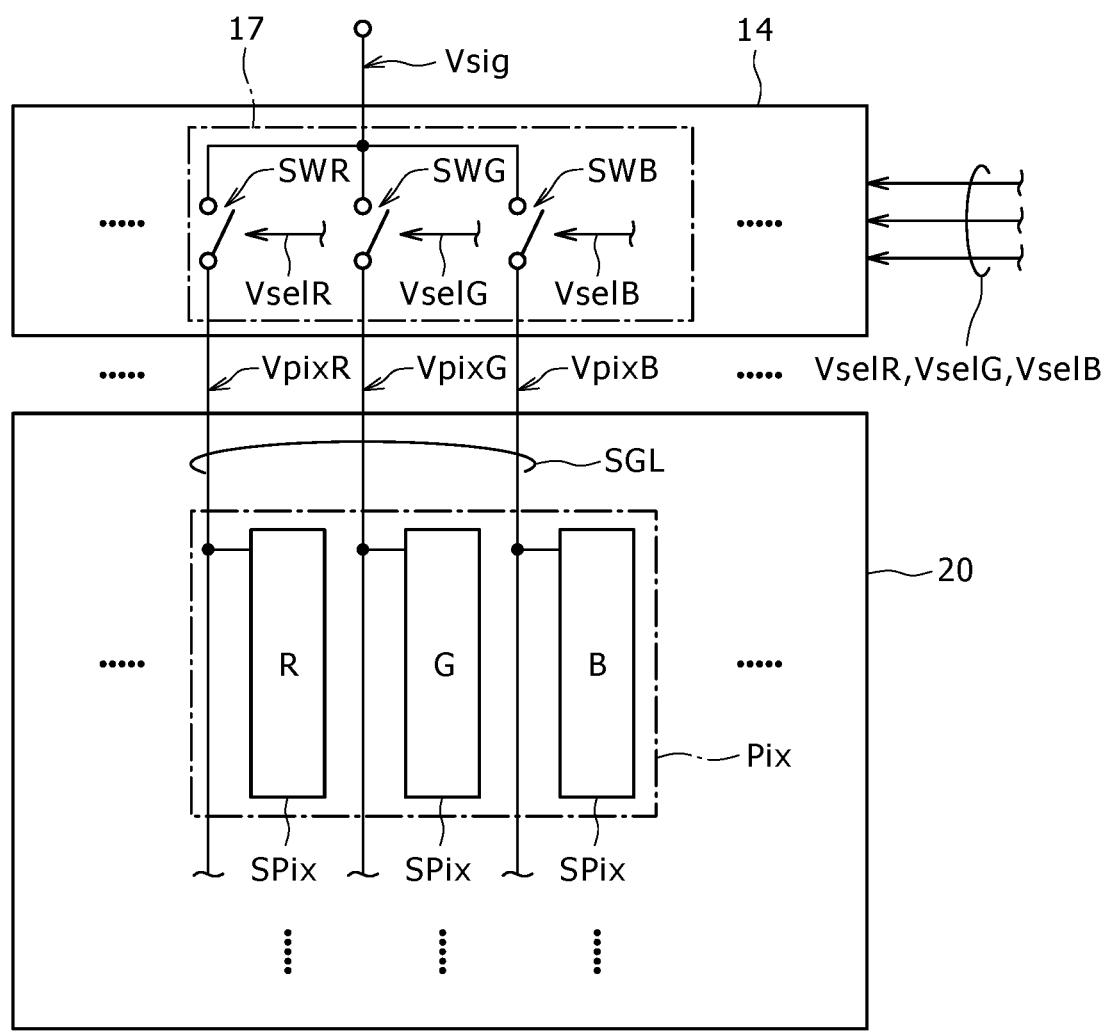
FIG. 2 is a block diagram showing one configuration example of a selection switch unit shown in FIG. 1.

FIG. 2 shows one configuration example of the selection switch unit 14. The selection switch unit 14 has plural switch groups 17. In this example, each switch group 17 is composed of three switches SWR, SWG, and SWB. One terminals of these switches are connected to each other and supplied with the pixel signal Vsig from the source driver 13, and the other terminals are each connected to a respective one of the sub-pixels SPix corresponding to red (R), green (G), and blue (B) via a pixel signal line SGL of the display unit 20. These three switches SWR, SWG, and SWB are on/off-controlled by the switch control signals VselR, VselG, and VselB supplied from the source driver 13. Based on this configuration, the selection switch unit 14 sequentially turns these three switches to the on-state in a time-division manner in response to the switch control signals VselR, VselG, and VselB to thereby function to separate the pixel signals Vpix (VpixR, VpixG, VpixB) from the pixel signal Vsig obtained by multiplexing. Furthermore, the selection switch unit 14 supplies these pixel signals Vpix to three sub-pixels SPix.

The drive signal generator 15 generates a drive signal Vcom with an alternate current (AC) rectangular waveform based on the control signal supplied from the controller 11 and supplies it to the drive electrode driver 16.

The drive electrode driver 16 is a circuit that supplies the drive signal Vcom to common drive electrodes COML (described later) of the display unit 20 based on the control signal supplied from the controller 11. Specifically, the drive electrode driver 16 applies the drive signals Vcom having AC rectangular waveforms with polarities opposite to each other to the common drive electrodes COML adjacent to each other as described later. In association with this, the pixel signals Vpix with polarities opposite to each other are applied to the sub-pixels SPix adjacent to each other. That is, in this example, the display unit 20 is driven by so-called dot-inversion driving (sub-pixel-inversion driving).

The display unit 20 is configured with use of the liquid crystal display element and performs displaying through sequential scanning of each one horizontal line based on the pixel signal Vpix, the scan signal Vscan, and the drive signal Vcom as described later.

Figure 3:
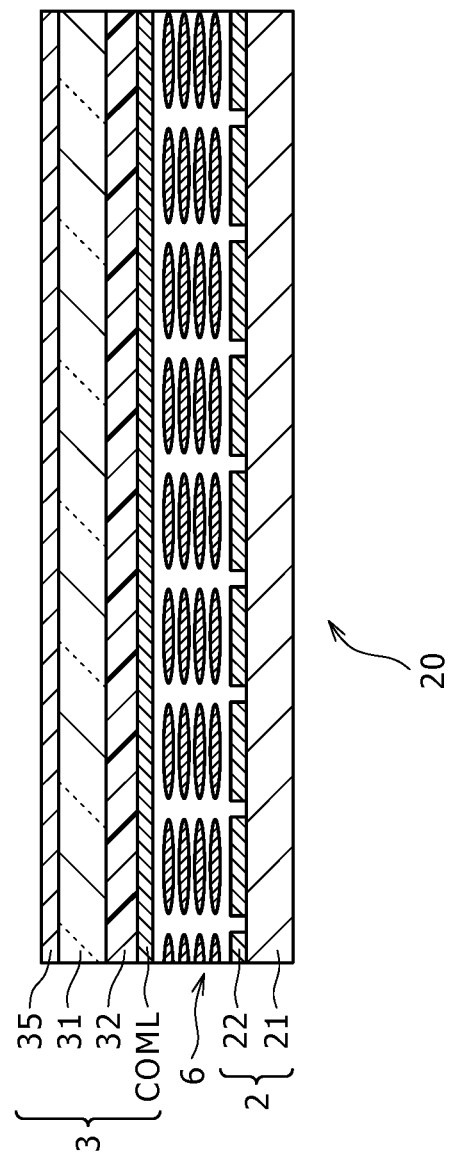
FIG. 3 is a sectional view showing the schematic sectional structure of a display unit shown in FIG. 1.

FIG. 3 shows an example of the sectional structure of the major part of the display unit 20. This display unit 20 includes a pixel substrate 2, a counter substrate 3 disposed opposed to this pixel substrate 2, and a liquid crystal layer 6 interposed between the pixel substrate 2 and the counter substrate 3.

The pixel substrate 2 has a TFT substrate 21 as a circuit board and plural pixel electrodes 22 arranged in a matrix on this TFT substrate 21. On the TFT substrate 21, thin film transistors (TFT) of the respective pixels and interconnects such as the pixel signal line SGL to supply the pixel signal Vpix to each pixel electrode 22 and the scan signal line GCL to drive each TFT are formed although not shown in the drawing.

The counter substrate 3 has a glass substrate 31, a color filter 32 formed on one surface of this glass substrate 31, and the plural common drive electrodes COML formed on this color filter 32. The color filter 32 is configured by periodically arranging color filter layers of e.g. three colors of red (R), green (G), and blue (B) and three colors of R, G, and B are associated with each display pixel as one set. The common drive electrode COML functions as the common drive electrode of the display unit 20. The common drive electrode COML is coupled to the TFT substrate 21 by a contact electrically-conductive pillar (not shown) and the drive signal Vcom having an AC rectangular waveform is applied from the TFT substrate 21 to the common drive electrode COML via this contact electrically-conductive pillar. A polarizer 35 is disposed on the other surface of the glass substrate 31.

The liquid crystal layer 6 modulates light passing through it depending on the state of an electric field. For example, a liquid crystal of any of various modes such as twisted nematic (TN), vertical alignment (VA), and electrically controlled birefringence (ECB) modes is used.

An alignment film is provided between the liquid crystal layer 6 and the pixel substrate 2 and between the liquid crystal layer 6 and the counter substrate 3, and an incidence-side polarizer is disposed on the lower surface side of the pixel substrate 2. In FIG. 3, diagrammatic representation of these components is omitted.

Figure 4:
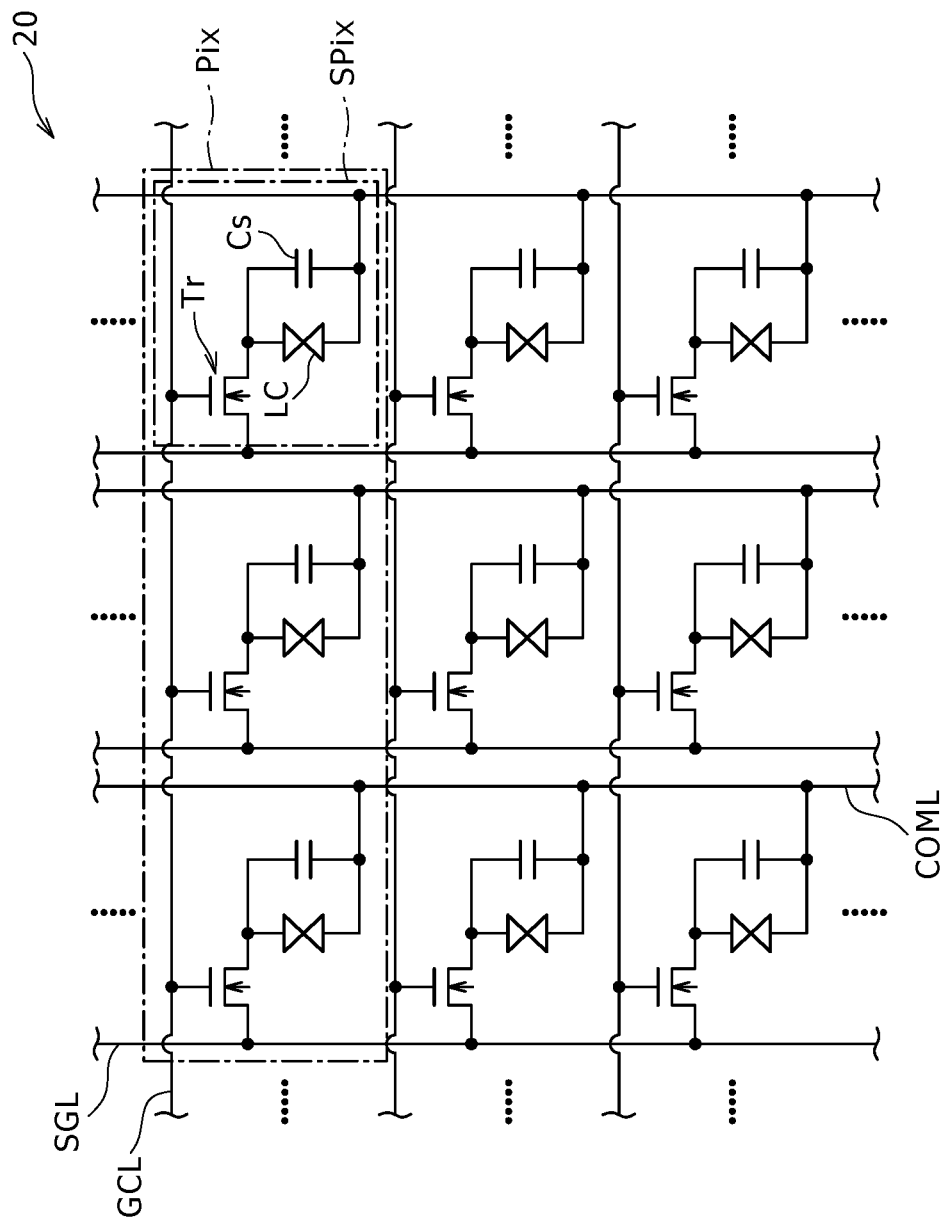
FIG. 4 is a circuit diagram showing one configuration example of the display unit shown in FIG. 1.

FIG. 4 shows a configuration example of the pixel structure in the display unit 20. The display unit 20 has the plural pixels Pix arranged in a matrix. Each pixel Pix is composed of three sub-pixels SPix. These three sub-pixels SPix are so disposed as to each correspond to a respective one of three colors (RGB) of the color filter 32 shown in FIG. 3. The sub-pixel SPix has the TFT element Tr, a liquid crystal element LC, and a holding capacitance element Cs. The TFT element Tr is formed of a thin film transistor. In this example, it is formed of an n-channel metal oxide semiconductor (MOS) TFT. The source of the TFT element Tr is connected to the pixel signal line SGL. The gate is connected to the scan signal line GCL and the drain is connected to one terminal of the liquid crystal element LC. One terminal of the liquid crystal element LC is connected to the drain of the TFT element Tr and the other terminal is connected to the common drive electrode COML. The holding capacitance element Cs is to hold the potential difference across the liquid crystal element LC. One terminal thereof is connected to the drain of the TFT element Tr and the other terminal is connected to the common drive electrode COML.

The sub-pixel SPix is connected to the other sub-pixels SPix that belong to the same row of the display unit 20 by the scan signal line GCL. The scan signal line GCL is connected to the gate driver 12 and supplied with the scan signal Vscan by the gate driver 12. Furthermore, the sub-pixel SPix is connected to the other sub-pixels SPix that belong to the same column of the display unit 20 by the pixel signal line SGL. The pixel signal line SGL is connected to the selection switch unit 14 and supplied with the pixel signal Vpix by the selection switch unit 14.

Moreover, the sub-pixel SPix is connected to the other sub-pixels SPix that belong to the same column of the display unit 20 by the common drive electrode COML. The common drive electrode COML is connected to the drive electrode driver 16 and supplied with the drive signal Vcom by the drive electrode driver 16.

Figure 5:
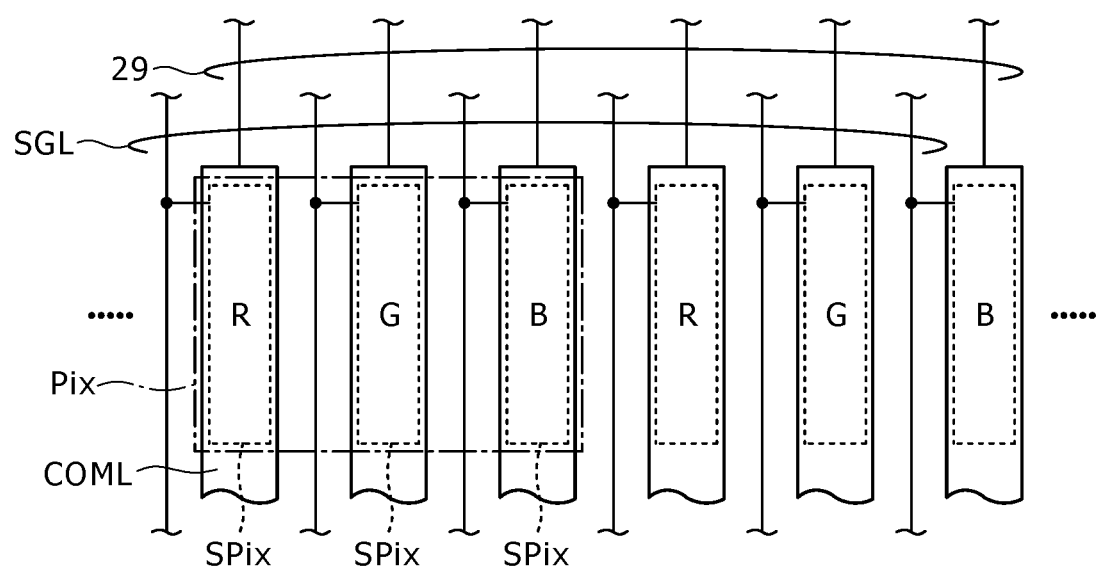
FIG. 5 is an explanatory diagram showing one configuration example of a drive electrode shown in FIG. 4.

FIG. 5 shows one configuration example of the common drive electrode COML. In this example, the common drive electrodes COML are so formed as to be extended along the same direction as that of the pixel signal lines SGL, and the plural sub-pixels SPix that belong to the same one column share one common drive electrode COML. Each common drive electrode COML is connected to the drive electrode driver 16 via a drive electrode line part 29. That is, the drive electrode driver 16 supplies the drive signal Vcom in units of the sub-pixel SPix.

Based on this configuration, in the display unit 20, the gate driver 12 drives the scan signal lines GCL in such a manner as to line-sequentially scan them in a time-division manner and thereby one horizontal line is sequentially selected. In addition, the selection switch unit 14 supplies the pixel signal Vpix to the pixels Pix that belong to this one horizontal line and thereby displaying is performed on each one horizontal line basis.

Figure 6A:
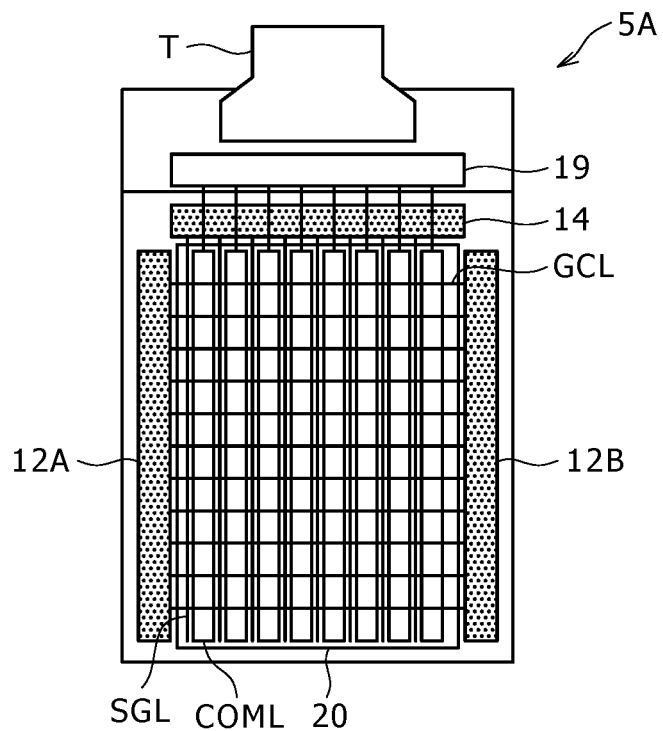
FIGS. 6A and 6B are schematic diagrams showing examples of mounting of the display device shown in FIG. 1 into a module.
Figure 6B:
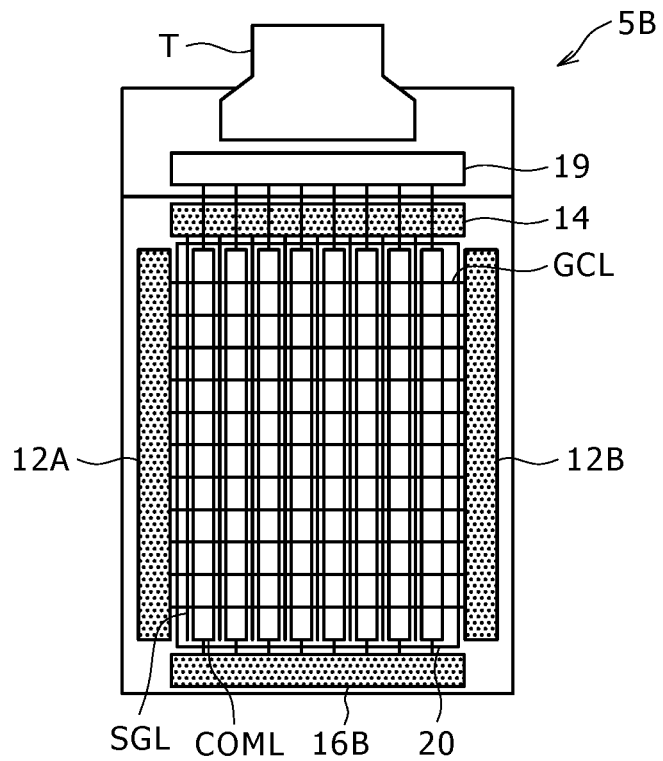

FIGS. 6A and 6B schematically show mounting of the display device 1 into a display module: FIG. 6A shows one example of the mounting and FIG. 6B shows another example.

A display module 5A shown in FIG. 6A has the display unit 20, a chip on glass (COG) 19, gate drivers 12A and 12B, and the selection switch unit 14. As schematically shown in FIG. 6A, in the display unit 20, the common drive electrodes COML are so formed as to be extended along the same direction as that of the pixel signal lines SGL. The COG 19 is a chip mounted on the TFT substrate 21 and includes the respective circuits used for display operation, such as the controller 11, the source driver 13, the drive signal generator 15, and the drive electrode driver 16 shown in FIG. 1. The gate drivers 12A and 12B are equivalent to the gate driver 12 shown in FIG. 1 and are so configured as to apply the scan signal Vscan to the scan signal line SGL from both sides of the display unit 20. The gate drivers 12A and 12B and the selection switch unit 14 are formed on the TFT substrate 21, which is a glass substrate.

A display module 5B shown in FIG. 6B includes a drive electrode driver 16B on the opposite side to a terminal part T of the display unit 20. This drive electrode driver 16B is provided to assist the drive electrode driver 16 included in the COG 19. Based on this configuration, in the display module 5B, the drive electrode driver 16 in the COG 19 and the drive electrode driver 16B apply the drive signal Vcom to the common drive electrode COML from both sides of the display unit 20.

As shown in FIGS. 6A and 6B, the common drive electrodes COML are connected to the COG 19 including the drive electrode driver 16 across a short distance. The drive electrode driver 16 is formed in the same COG 19 as that of the drive signal generator 15, which generates the drive signal Vcom. The COG 19 is disposed at a position near the terminal part T to supply the power of the COG 19. This allows the drive electrode driver 16 to drive the common drive electrodes COML with low output impedance.

The pixel signal line SGL is equivalent to one specific example of the "signal line" in the present disclosure. The common drive electrode COML is equivalent to one specific example of the "common drive electrode" in the present disclosure. The liquid crystal element LC is equivalent to one specific example of the "display element" in the present disclosure. The drive electrode driver 16 is equivalent to one specific example of the "driver" in the present disclosure.

[Operation and Effect]

The operation and effect of the display device 1 of the present embodiment will be described below.

(Outline of Overall Operation)

The controller 11 supplies the control signal to each of the gate driver 12, the source driver 13, the drive signal generator 15, and the drive electrode driver 16 based on the video signal Vdisp supplied from the external and controls them so that they may operate in synchronization with each other. The gate driver 12 generates the scan signal Vscan and supplies it to the display unit 20. The source driver 13 generates the pixel signal Vsig obtained by multiplexing of the pixel signals Vpix and the switch control signals VselR, VselG, and VselB corresponding to the pixel signal Vsig and supplies these signals to the selection switch unit 14. The selection switch unit 14 generates the pixel signals Vpix by separation based on the pixel signal Vsig and the switch control signals VselR, VselG, and VselB and supplies them to the display unit 20. The drive signal generator 15 generates the drive signal Vcom and supplies it to the drive electrode driver 16. The drive electrode driver 16 applies the drive signal Vcom to the common drive electrode COML of the display unit 20. The display unit 20 performs line-sequential scanning on each one horizontal line basis based on the supplied pixel signal Vpix, scan signal Vscan, and drive signal Vcom to thereby display the image corresponding to the video signal Vdisp.

(Detailed Operation)

The detailed operation of the display device 1 will be described below with use of several diagrams.

FIGS. 7A to 7E show timing waveform examples of the display device 1. Specifically, FIG. 7A shows the waveform of the drive signal Vcom. FIG. 7B shows the waveform of the scan signal Vscan. FIG. 7C shows the waveform of the pixel signal Vsig. FIG. 7D shows the waveforms of the switch control signals VselR, VselG, and VselB. FIG. 7E shows the waveforms of the pixel signals VpixR, VpixG, and VpixB.

The display device 1 carries out display operation by dot-inversion driving (sub-pixel-inversion driving) based on the drive signal Vcom, the scan signal Vscan, and the pixel signal Vsig. Details of the operation will be described below.

First, at timing t1, the drive signal generator 15 inverts the drive signal Vcom and the drive electrode driver 16 applies this drive signal Vcom to the common drive electrode COML (FIG. 7A).

Next, at timing t2, the gate driver 12 applies the scan signal Vscan(n) to the scan signal line GCL for the pixels Pix on the n-th row and the scan signal Vscan(n) changes from the low level to the high level (FIG. 7B). Thereby, the TFT elements Tr of the pixels Pix on the n-th row become the on-state and one horizontal line in which writing operation is carried out in the display unit 20 is selected.

Next, the source driver 13 outputs the pixel signal Vsig and the switch control signals VselR, VselG, and VselB. Specifically, first, at timing t3, the source driver 13 outputs a voltage VR for the sub-pixel SPix of red (R) (FIG. 7C) and changes the switch control signal VselR from the low level to the high level (FIG. 7D). At this time, the switch SWR in each of the switch groups 17 of the selection switch unit 14 becomes the on-state and the pixel signal VpixR (voltage VR) is supplied to the pixel signal line SGL connected to the switch SWR (FIG. 7E). Thereafter, when the switch control signal VselR changes from the high level to the low level, the switch SWR becomes the off-state and the pixel signal line SGL connected to the switch SWR becomes the floating state. Thus, the pixel signal VpixR is kept. Similarly, at timing t4, the source driver 13 outputs a voltage VG for the sub-pixel SPix of green (G) (FIG. 7C) and changes the switch control signal VselG from the low level to the high level (FIG. 7D) to thereby supply the pixel signal VpixG (voltage VG) to the pixel signal line SGL connected to the switch SWG (FIG. 7E). Subsequently, at timing t5, the source driver 13 outputs a voltage VB for the sub-pixel SPix of blue (B) (FIG. 7C) and changes the switch control signal VselB from the low level to the high level (FIG. 7D) to thereby supply the pixel signal VpixB (voltage VB) to the pixel signal line SGL connected to the switch SWB (FIG. 7E).

In the pixels Pix in one horizontal line, the pixel signals Vpix (VpixR, VpixG, VpixB) are supplied via the pixel signal lines SGL in the above-described manner and thereby writing is performed.

Thereafter, at timing t6, the gate driver 12 changes the scan signal Vscan(n) from the high level to the low level (FIG. 7B). Thereby, the TFT elements Tr of the pixels Vpix on the n-th row become the off-state, so that the writing operation is ended.

From then on, by repeating the above-described operation, the display device 1 carries out the writing operation for the whole display surface.

Figures 8A, 8B:
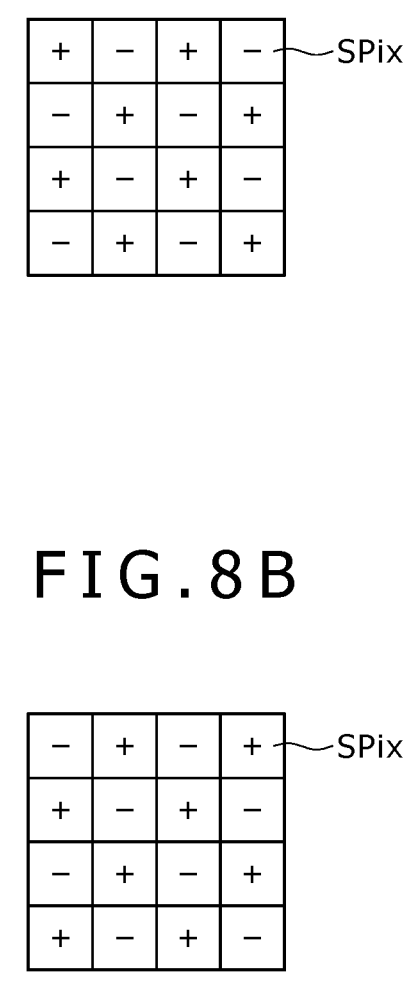

FIGS. 8A and 8B schematically show the dot-inversion driving. Specifically, FIG. 8A shows the polarities of the pixel potentials for the sub-pixels SPix in a certain frame. FIG. 8B show the polarities of the pixel potentials in the next frame. The pixel potential refers to the potential difference between the pixel signal Vpix and the drive signal Vcom in the sub-pixel SPix. As shown in FIGS. 8A and 8B, in the dot-inversion driving, driving is performed in such a manner that the polarities of the pixel potentials of the sub-pixels SPix adjacent to each other are different from each other in a certain frame. Furthermore, the polarities of the pixel potentials of all of the sub-pixels SPix are inverted on a frame-by-frame basis.

In this dot-inversion driving, the drive electrode driver 16 applies the drive signals Vcom having AC rectangular waveforms with polarities opposite to each other to the common drive electrodes COML adjacent to each other. Furthermore, in association with this operation of the drive electrode driver 16, the source driver 13 and the selection switch unit 14 apply the pixel signals Vpix with polarities opposite to each other to the pixel signal lines SGL adjacent to each other.

In this manner, in the display device 1, the drive signal Vcom is supplied from each of the different common drive electrodes COML to a respective one of the sub-pixels SPix in one horizontal line that is selected by the scan signal Vscan and in which the pixel signal Vpix is written. That is, in the writing operation, the drive signal Vcom is independently supplied to each of the sub-pixels SPix in this one horizontal line. This can reduce the possibility that noise is mixed from the other sub-pixels SPix in this one horizontal line via the common drive electrode COML.

Next, the load of the drive electrode driver 16 will be described below.

FIGS. 9A and 9B show the equivalent circuit of the display unit 20. Specifically, FIG. 9A shows the case in which the TFT elements Tr are in the off-state. FIG. 9B shows the case in which the TFT elements Tr are in the on-state. A capacitive element Clc is an equivalent element when the liquid crystal element LC is regarded as a capacitive element.

When the scan signal Vscan at the low level is applied to the scan signal line GCL and the TFT element Tr is in the off-state, the TFT element Tr can be replaced by a capacitive element Cds corresponding to the parasitic capacitance between the drain and the source as shown in FIG. 9A. At this time, the load from the viewpoint of the common drive electrode COML in each sub-pixel SPix is series capacitance made with parallel capacitance (Clc+Cs) of the capacitive elements Clc and Cs and the capacitive element Cds. In general, the capacitance Cds is sufficiently lower than the capacitance (Clc+Cs) and therefore this series capacitance is almost equal to the capacitance Cds. That is, the load from the viewpoint of the common drive electrode COML in the sub-pixel SPix in which the TFT element Tr is in the off-state is a light capacitive load.

On the other hand, when the scan signal Vscan at the high level is applied to the scan signal line GCL and the TFT element Tr is in the on-state, the TFT element Tr can be replaced by a resistive element Ron corresponding to the on-resistance between the drain and the source as shown in FIG. 9B. In general, this on-resistance is sufficiently low and therefore the capacitance (Clc+Cs) is dominant in the load from the viewpoint of the common drive electrode COML in each sub-pixel SPix. That is, the load from the viewpoint of the common drive electrode COML in the sub-pixel SPix in which the TFT element Tr is in the on-state is a heavy capacitive load.

In the display device 1, always writing is performed in only one sub-pixel SPix of the sub-pixels SPix connected to a respective one of the common drive electrodes COML. That is, the total load from the viewpoint of the common drive electrode COML in the display unit 20 is the sum of the heavy capacitive load of the sub-pixel SPix in one horizontal line as the writing subject and the light capacitive loads of the other sub-pixels SPix. That is, the sub-pixel SPix with the heavy capacitive load is only one sub-pixel for each common drive electrode COML. This makes it easier for the drive electrode driver 16 to drive the common drive electrodes COML.

[Comparison with Comparative Example]

The effect of the present embodiment will be described below based on comparison with a comparative example.

First, a display device 1R according to the comparative example will be described. In the present embodiment (FIG. 4), the common drive electrodes COML are so formed as to be extended along the same direction as that of the pixel signal lines SGL. Instead of this, the common drive electrodes COML are so formed as to be extended along a direction intersecting with the pixel signal lines SGL in the present comparative example. That is, the display device 1R is configured with use of a display unit 20R in which the common drive electrodes COML are formed in this manner. The other configuration is the same as that of the present embodiment (FIG. 1).

Figure 10:
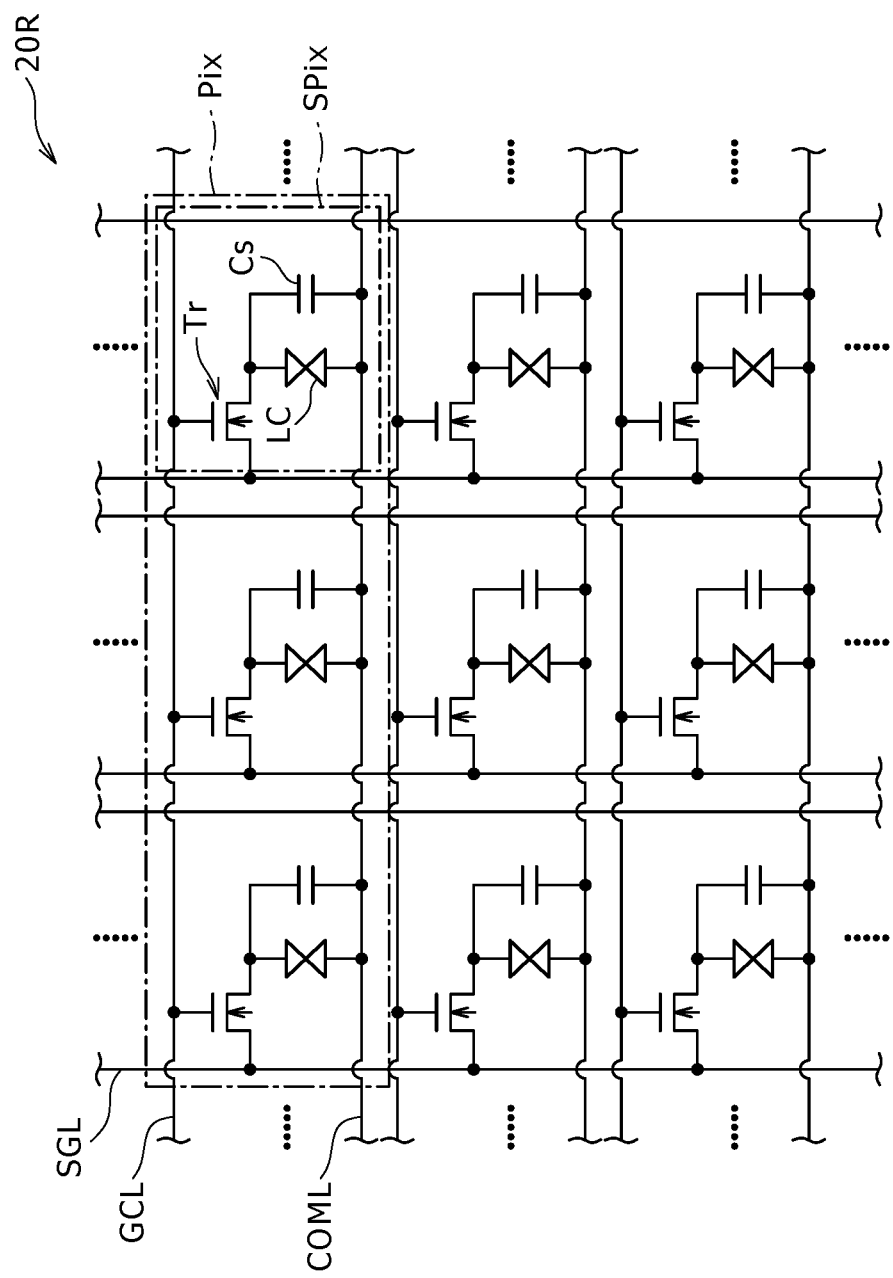
FIG. 10 is a circuit diagram showing one configuration example of the display unit according to a comparative example.

FIG. 10 shows a configuration example of the pixel structure in the display unit 20R. As shown in FIG. 10, in the display unit 20R, the common drive electrodes COML are so formed as to be extended along a direction intersecting with the pixel signal lines SGL and the sub-pixel SPix is connected to the other sub-pixels SPix that belong to the same row of the display unit 20R by the common drive electrode COML. That is, the plural sub-pixels SPix that belong to the same one row share one common drive electrode COML.

Figure 11:
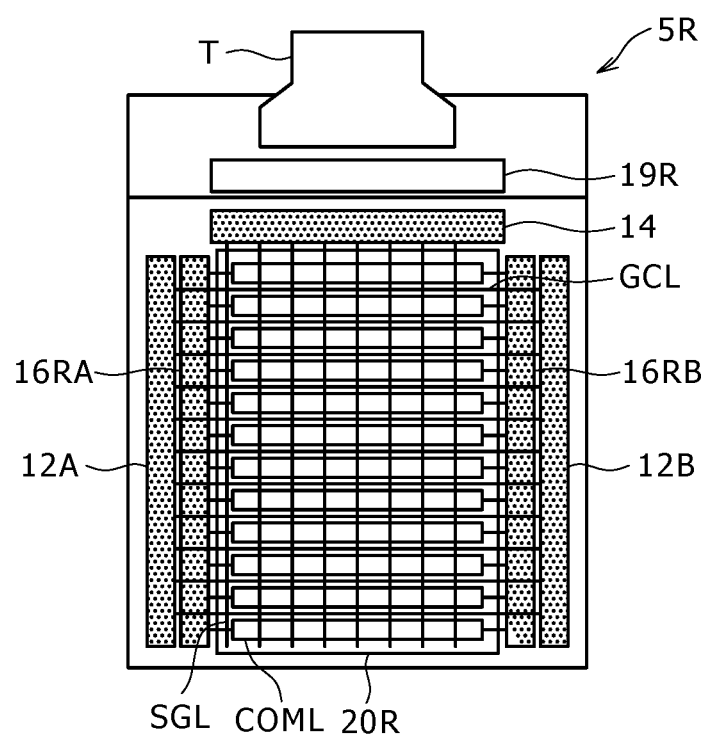
FIG. 11 is a schematic diagram showing an example of mounting of the display device according to the comparative example into a module.

FIG. 11 schematically shows mounting of the display device 1R into a display module 5R. The display module 5R has the display unit 20R, drive electrode drivers 16RA and 16RB, and a COG 19R. In the display unit 20R according to the present comparative example, the common drive electrodes COML are so formed as to be extended along a direction intersecting with the pixel signal lines SGL as schematically shown in FIG. 11. The drive electrode drivers 16RA and 16RB (hereinafter, referred to also as drive electrode drivers 16R collectively) are equivalent to the drive electrode driver 16 shown in FIG. 1 and are so configured as to apply the drive signal Vcom to the common drive electrode COML from both sides of the display unit 20R. The COG 19R includes the respective circuits used for display operation, such as the controller 11, the source driver 13, and the drive signal generator 15 shown in FIG. 1. Specifically, in the display device 1 according to the present embodiment (FIG. 6A), the drive electrode driver 16 is formed in the COG 19. In contrast, in the display device 1R according to the present comparative example (FIG. 11), the drive electrode drivers 16R are formed not in the COG 19R but on the TFT substrate 21 on both sides of the display unit 20R in order to connect the drive electrode drivers 16R to the common drive electrodes COML across a short distance.

(Crosstalk Noise)

In the display device 1R, the drive signal Vcom is supplied from the same common drive electrode COML to each of the sub-pixels SPix in one horizontal line that is selected by the scan signal Vscan and in which the pixel signal Vpix is written. That is, in the writing operation, the drive signal Vcom is supplied to the respective sub-pixels SPix in this one horizontal line via the common common drive electrode COML. Thus, possibly noise (crosstalk noise) is mixed from the other sub-pixels SPix in this one horizontal line via the common drive electrode COML. Details of this phenomenon will be described below.

FIGS. 12A to 12D show timing waveform examples of the display device 1R. Specifically, FIG. 12A shows the waveform of the scan signal Vscan. FIG. 12B shows the waveforms of the switch control signals VselR, VselG, and VselB. FIG. 12C shows the waveforms of the pixel signals VpixR, VpixG, and VpixB. FIG. 12D shows the waveform of the drive signal Vcom. The timing waveform examples of FIGS. 12A to 12D correspond to operation of writing the pixel signals Vpix (VpixR, VpixG, VpixB) to one horizontal line relating to the pixels Pix on the n-th row of the display unit 20R.

In the display device 1R, at timing t11, the drive signal generator 15 and the drive electrode drivers 16R invert the drive signal Vcom(n) relating to the pixels Pix on the n-th row to set it to the low voltage level (FIG. 12D). Thereafter, during the period from timing t12 to timing t16, the gate driver 12 sets the scan signal Vscan(n) relating to the pixels Pix on the n-th row to the high level to thereby select one horizontal line in which writing operation is carried out (FIG. 12A). In this period, the source driver 13 and the selection switch unit 14 sequentially apply the pixel signals VpixR, VpixG, and VpixB to the pixel signal line SGL. In this example, the pixel signal VpixR changes to a high voltage level simultaneously with turning of the switch control signal VselR to the high level and the pixel signal VpixB changes to a high voltage level simultaneously with turning of the switch control signal VselB to the high level. On the other hand, the pixel signal VpixG changes to a slightly high voltage level simultaneously with turning of the switch control signal VselG to the high level. That is, the potential difference between the pixel signal Vpix (VpixR, VpixG, VpixB) and the drive signal Vcom (pixel potential) is large in the sub-pixels SPix of red (R) and blue (B) and is small in the sub-pixel SPix of green (G). For example if the display unit 20R is the normally-black type, this state means that lighting with high luminance is obtained from the sub-pixels SPix of red (R) and blue (B) and lighting with low luminance is obtained from the sub-pixel SPix of green (G).

As shown in FIG. 12D, the drive signal Vcom includes a large amount of noise superimposed on the original AC rectangular waveform like that shown in FIG. 7A. For example, at the timings t12 and t16, the transition of the scan signal Vscan(n) appears as noise in the drive signal Vcom via parasitic capacitance between the scan signal line SGL and the common drive electrode COML. Furthermore, in the period from the timing t13 to the timing t16, the transition of the pixel signal Vpix (particularly pixel signals VpixR and VpixB) is propagated from the pixel electrode 22 to the common drive electrode COML via the capacitances Clc and Cs for example, and appears as noise in the drive signal Vcom.

Due to the influence of this noise, the drive signal Vcom(n) is not at its originally-designed voltage (−Vc) in the period from the timing t14 to the timing t15. Specifically, the voltage level of the drive signal Vcom(n) is somewhat higher than the originally-designed voltage (−Vc) (waveform part W1) due to the influence of the transition of the pixel signal VpixR in the period from the timing t13 to the timing t14. Therefore, although the pixel signal VpixG is applied in this period, insufficiency of the writing occurs and the luminance of the sub-pixel SPix of green (G) is lower than the desired value. As just described, if writing is performed through application of the pixel signal Vpix when the voltage level of the drive signal Vcom deviates from the originally-designed voltage, the luminance of this sub-pixel SPix deviates from the desired value.

In the display device 1R, the common drive electrodes COML are so formed as to be extended along a direction intersecting with the pixel signal lines SGL and the drive signal Vcom is supplied from the same common drive electrode COML to each of the sub-pixels SPix in one horizontal line in which writing operation is carried out. This causes a possibility that, in the writing operation, noise is mixed from the other sub-pixels SPix in this one horizontal line via the common drive electrode COML and the luminance deviates from the desired value. That is, in the display device 1R, possibly the occurrence of this crosstalk noise leads to the lowering of the image quality.

In contrast, in the display device 1 according to the present embodiment, the common drive electrodes COML are so formed as to be extended along the same direction as that of the pixel signal lines SGL and the drive signal Vcom is supplied from each of the different common drive electrodes COML to a respective one of the sub-pixels SPix in one horizontal line in which writing operation is carried out. This can reduce the possibility that, in the writing operation, noise is mixed from the other sub-pixels SPix in this one horizontal line via the common drive electrode COML, and thus can suppress the lowering of the image quality due to crosstalk noise.

(Load of Drive Electrode Driver 16R)

The load of the drive electrode driver 16R in the present comparative example will be described below.

Figure 13A:
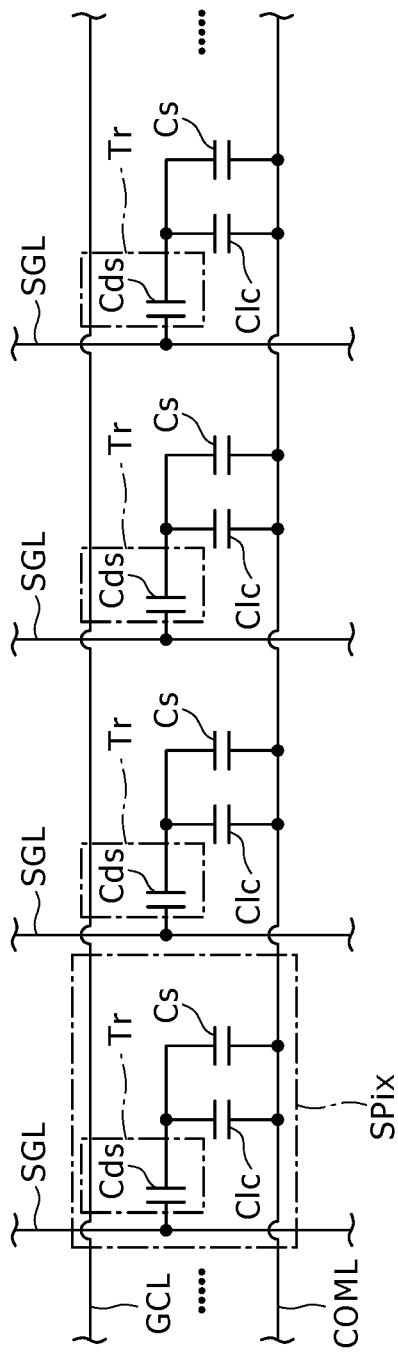
FIGS. 13A and 13B are circuit diagrams for explaining the operation of the display device according to the comparative example.
Figure 13B:
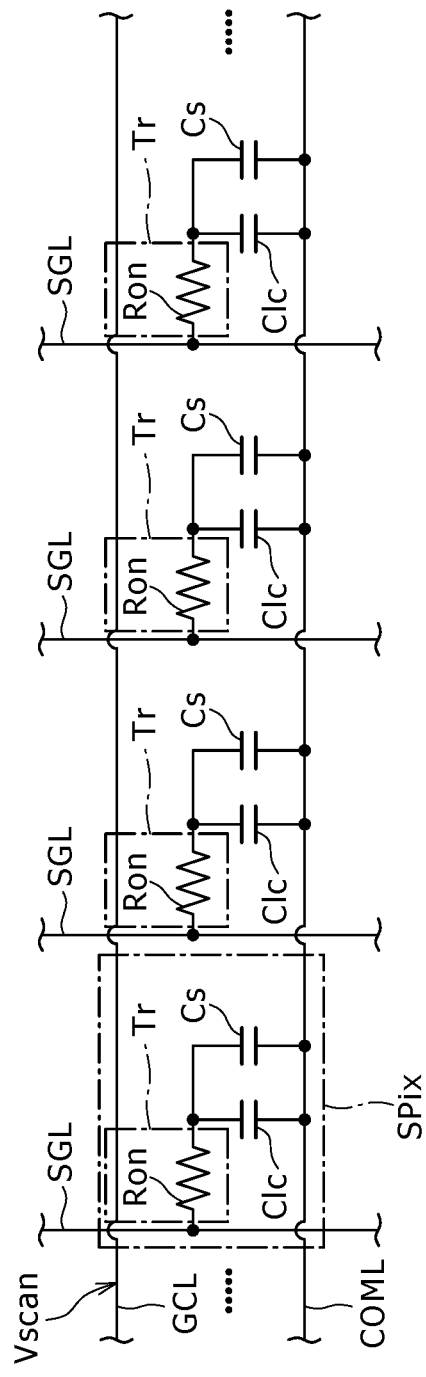

FIGS. 13A and 13B show the equivalent circuit of the display unit 20R according to the comparative example. Specifically, FIG. 13A shows the case in which the TFT elements Tr are in the off-state. FIG. 13B shows the case in which the TFT elements Tr are in the on-state.

The load from the viewpoint of the common drive electrode COML in each sub-pixel SPix is the same as that in the display device 1 of the present embodiment (FIGS. 9A and 9B). Specifically, when the TFT element Tr is in the off-state (writing operation is not carried out), as shown in FIG. 13A, this load is series capacitance made with parallel capacitance (Clc+Cs) of the capacitive elements Clc and Cs and the capacitive element Cds, and thus is a light capacitive load almost equal to the capacitance Cds. When the TFT element Tr is in the on-state (writing operation is carried out), this load is a heavy capacitive load almost equal to the capacitance (Clc+Cs) as shown in FIG. 13B.

However, in the display device 1R, the common drive electrodes COML are so formed as to be extended along a direction intersecting with the pixel signal lines SGL differently from the display device 1. Therefore, in the rows in which writing operation is not carried out, writing is carried out in none of all the sub-pixels SPix connected to the respective common drive electrodes COML. In the row in which writing operation is carried out, writing is carried out in all the sub-pixels SPix connected to the corresponding common drive electrode COML. Specifically, as shown in FIG. 13A, the total load of the common drive electrode COML relating to the row in which writing is not performed in the display unit 20R is the sum of the light capacitive loads of all the sub-pixels SPix that belong to this row. In contrast, as shown in FIG. 13B, the total load of the common drive electrode COML relating to the row in which writing is performed in the display unit 20R is the sum of the heavy capacitive loads of all the sub-pixels SPix that belong to this row. That is, the total load of the common drive electrode COML greatly differs depending on whether or not writing is performed. In particular, the total load is a very large capacitive load when writing is performed. The drive electrode driver 16R needs to be so configured as to be capable of driving this very large capacitive load when writing is performed, and therefore possibly the circuit area and the power consumption increase in order to realize strong driving force.

Furthermore, in the display device 1R, as shown in FIG. 11, the drive electrode drivers 16R are disposed at positions distant from the COG 19R, in which the drive signal generator 15 is formed, and the terminal part T, to which power is supplied. Therefore, the output impedance of the drive electrode driver 16R increases due to the time constant of the interconnects for connecting these units, and possibly the driving force of the drive electrode driver 16R is limited.

In contrast, in the display device 1 according to the present embodiment, the common drive electrodes COML are so formed as to be extended along the same direction as that of the pixel signal lines SGL. Therefore, always writing is performed in only one sub-pixel SPix of the sub-pixels SPix connected to a respective one of the common drive electrodes COML. Thus, the total load of the common drive electrode COML in the display unit 20 does not change depending on whether or not writing is performed and is the sum of the heavy capacitive load of one sub-pixel SPix in which the writing operation is carried out and the light capacitive loads of the other sub-pixels SPix. That is, the load of the common drive electrode COML is smaller than that in the display device 1R. Therefore, the drive electrode driver 16 does not need strong driving force equivalent to that in the display device 1R, so that increases in the circuit area and the power consumption can be suppressed.

Furthermore, in the display device 1 according to the present embodiment, as shown in FIGS. 6A and 6B, the drive electrode driver 16 is formed in the COG 19 together with the drive signal generator 15 and can be disposed at a position close to the terminal part T, to which power is supplied. Thus, the length of the interconnects for connecting these units can be set short and the lowering of the driving force of the drive electrode driver 16 can be suppressed.

Figure 14A:
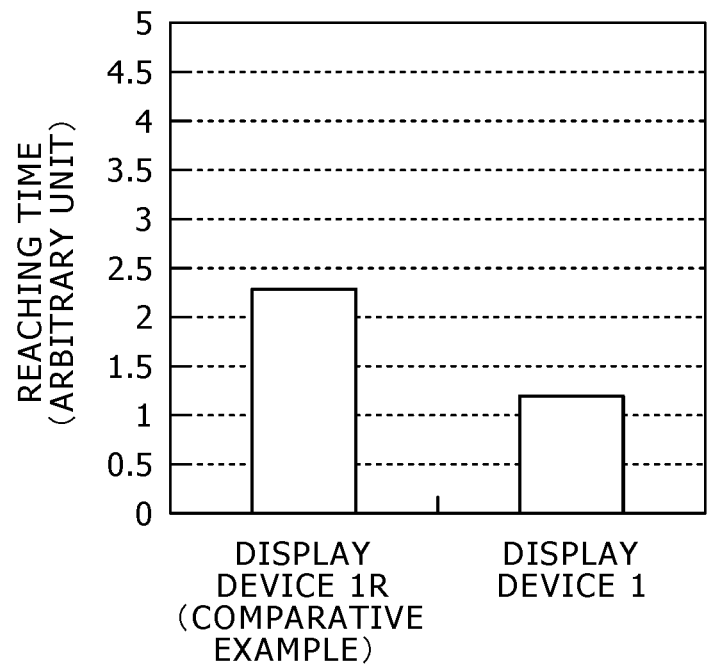
FIGS. 14A and 14B are characteristic diagrams showing characteristics of the display devices according to the embodiment and the comparative example.
Figure 14B:
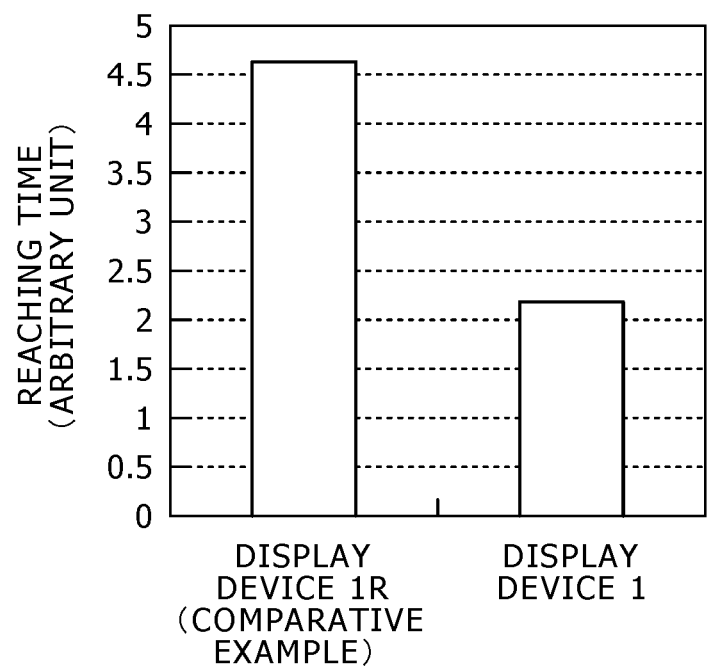

FIGS. 14A and 14B show results of simulation about the capability of writing to the pixel in the display device 1 according to the present embodiment and the display device 1R according to the present comparative example. In the simulation of FIGS. 14A and 14B, the reaching time from application of the pixel signal Vpix to the pixel signal line SGL by the source driver 13 and the selection switch unit 14 to the timing when the potential difference between the pixel signal Vpix and the drive signal Vcom (pixel potential) in a certain sub-pixel SPix reaches a predetermined potential is used as the index for evaluating the writing capability. FIG. 14A shows the reaching time of the pixel potential in the sub-pixel SPix close to the drive electrode driver 16. FIG. 14B shows the reaching time of the pixel potential in the sub-pixel SPix around the center of the display surface. In this example, the display device 1 according to the present embodiment has a configuration like that shown in FIG. 6B and the common drive electrode COML is driven from both sides of the display unit 20. That is, FIG. 14A shows the data of the sub-pixel SPix in which the reaching time is the shortest. FIG. 14B shows the data of the sub-pixel SPix in which the reaching time is the longest.

As shown in FIGS. 14A and 14B, the reaching time in the display device 1 according to the present embodiment is half that in the display device 1R according to the present comparative example. That is, in the display device 1 (FIG. 6B), the reaching time is shorter although the common drive electrode COML is longer compared with the display device 1R (FIG. 11). This is because of the following reasons. Specifically, as described above, in the display device 1, the total load from the viewpoint of the common drive electrode COML is lighter compared with the display device 1R and the respective distances among the drive electrode driver 16, the drive signal generator 15, and the terminal part T are shorter compared with the display device 1R. Due to these features, in the display device 1, driving of the common drive electrode COML by the drive electrode driver 16 is facilitated and the reaching time can be shortened.

[Advantageous Effects]

As described above, in the present embodiment, the common drive electrodes COML are so formed as to be extended along the same direction as that of the pixel signal lines SGL and the drive signal Vcom is supplied from each of the different common drive electrodes COML to a respective one of the sub-pixels SPix in one horizontal line in which writing is performed. This can reduce the possibility that noise is mixed from the other sub-pixels SPix in this one horizontal line via the common drive electrode COML and can suppress the deterioration of the image quality.

Furthermore, in the present embodiment, writing is performed for only one sub-pixel SPix of the plural sub-pixels SPix connected to a respective one of the common drive electrodes COML. Thus, the capacitive load component of the display unit from the viewpoint of the common drive electrode COML can be set small and driving of the common drive electrode COML by the drive electrode driver can be facilitated.

In addition, in the present embodiment, the drive electrode driver is disposed at a position close to the display unit, the drive signal generator, and the terminal part T. Thus, the time constant of the interconnects among these units can be set small and driving of the common drive electrode COML by the drive electrode driver can be facilitated.

Modification Example 1-1

Figure 15:
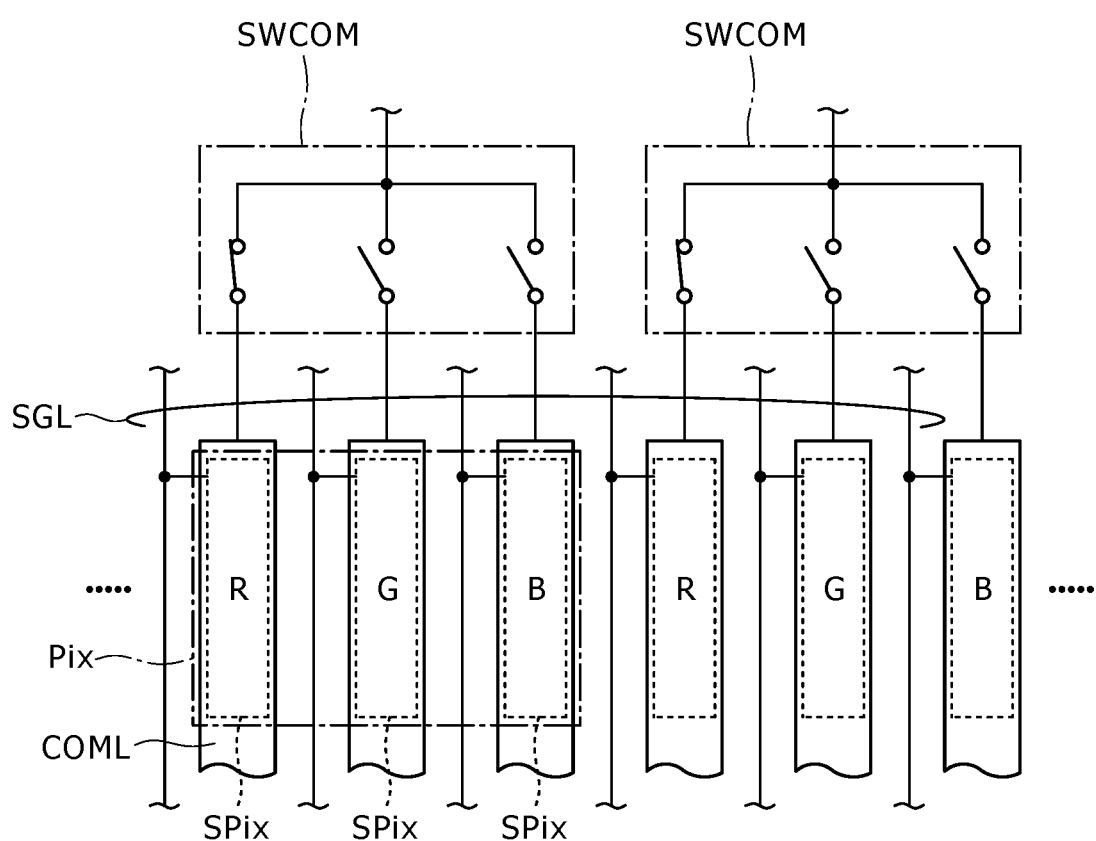
FIG. 15 is an explanatory diagram showing one configuration example of the drive electrode according to a modification example.
Figure 25:
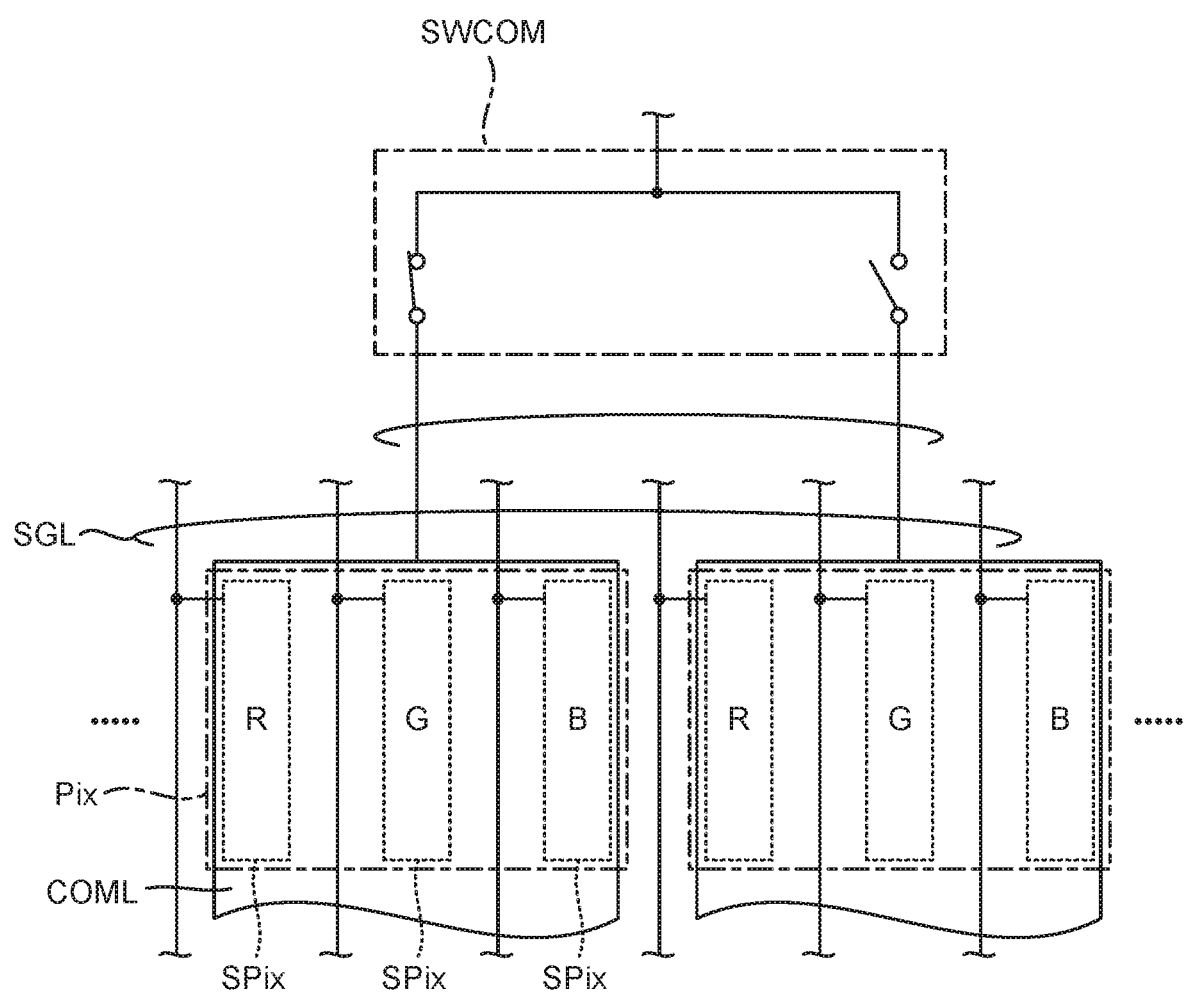
FIG. 25 is an explanatory diagram showing one configuration example of the drive electrode according to the modification examples of FIGS. 15 and 16B.

In the above-described embodiment, the respective common drive electrodes COML are each directly connected to the drive electrode driver 16 via the drive electrode line part 29. However, the configuration is not limited thereto. Instead of this, the common drive electrodes COML may be connected to the drive electrode driver 16 via a switch as shown in FIGS. 15 and 25 for example. In the example of FIG. 15, this switch (drive electrode switch SWCOM) is composed of three switches. In the example of FIG. 25, this switch is composed of two switches. One terminals of these switches are connected to each other and supplied with the drive signal Vcom from the drive electrode driver 16 and the other terminals are connected to the common drive electrodes COML of the display unit 20. In the example of FIG. 15, for example three switches in each drive electrode switch SWCOM are sequentially turned to the on-state in a time-division manner, and thereby the drive electrode driver 16 can supply the drive signal Vcom to each of the common drive electrodes COML. In the example of FIG. 25, for example two switches in each drive electrode switch SWCOM are sequentially turned to the on-state in a time-division manner, and thereby the drive electrode driver 16 can supply the drive signal Vcom to each of the common drive electrodes COML.

Modification Example 1-2

In the above-described embodiment, the drive signal Vcom is supplied in units of the sub-pixel SPix. However, the configuration is not limited thereto. Instead of this, the drive signal Vcom may be supplied in units of the plural sub-pixels SPix for example. Several examples will be described below.

Figure 16A:
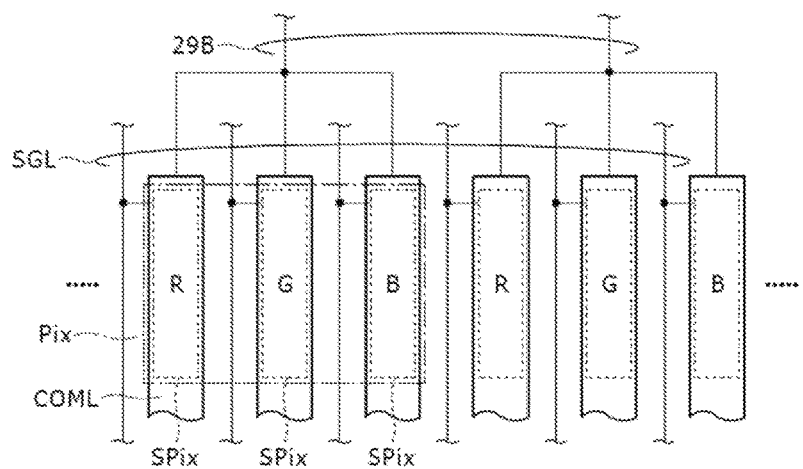
FIGS. 16A and 16B are explanatory diagrams showing one configuration example of the drive electrode according to another modification example.
Figure 16B:
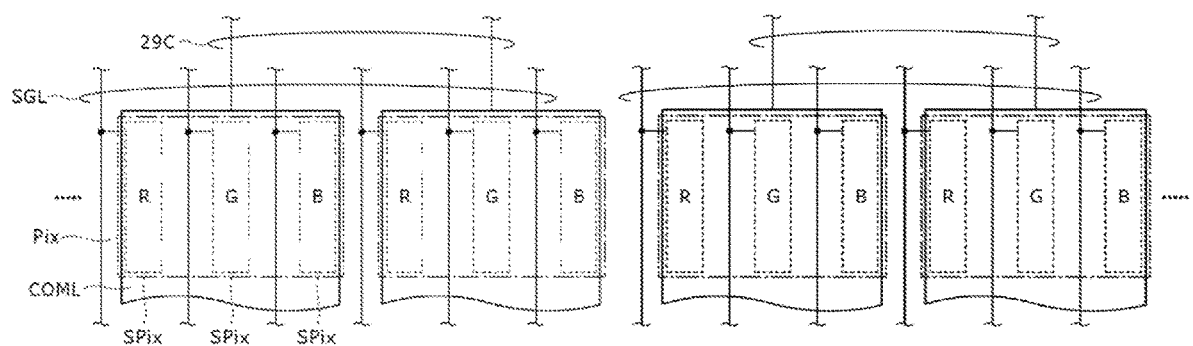

FIGS. 16A, 16B, and 25 show configuration examples when the drive signal Vcom is supplied in units of the pixel Pix. FIG. 16A shows a configuration example in which, of the common drive electrodes COML formed on each sub-pixel SPix basis, three common drive electrodes COML relating to the same pixel Pix are connected to each other (drive electrode line part 29B) and connected to the drive electrode driver 16. FIG. 16B shows a configuration example in which the common drive electrodes COML each corresponding to the width of the pixel Pix (three sub-pixels SPix) are formed and connected to the drive electrode driver 16 via a drive electrode line part 29C. FIG. 25 shows a configuration example in which the common drive electrodes COML each corresponding to the width of the pixel Pix (three sub-pixels SPix) are formed and connected to the drive electrode driver 16 via the drive electrode switch SWCOM. These configurations allow the drive electrode driver 16 to supply the drive signal Vcom in units of the pixel Pix. In this case, the dot-inversion driving for the display unit 20 is not the sub-pixel-inversion driving, in which the polarity is inverted on each sub-pixel SPix basis, described for the above-described embodiment but pixel-inversion driving in which the polarity is inverted on each pixel Pix basis.

FIG. 17 shows one configuration example when the drive signal Vcom is supplied in units of two pixels Pix. The common drive electrodes COML each corresponding to the width of two pixels Pix are formed and connected to the drive electrode driver 16 via a drive electrode line part 29D. This configuration allows the drive electrode driver 16 to supply the drive signal Vcom in units of two pixels Pix. In this case, the driving method for the display unit 20 is inversion driving in which the polarity is inverted every two pixels Pix.

Modification Example 1-3

Figures 18A, 18B, 19:
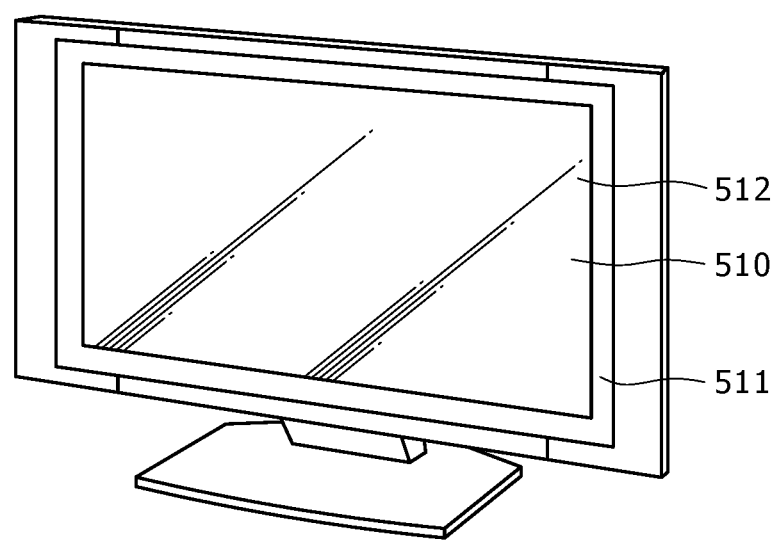
FIGS. 18A and 18B are schematic diagrams showing one operation example of the display device according to another modification example.
FIG. 19 is a perspective view showing the appearance configuration of application example 1 of pieces of electronic apparatus to which the embodiment is applied.

In the above-described embodiment, the display unit 20 is driven based on the dot-inversion driving. However, the configuration is not limited thereto. Instead of this, the display unit 20 may be driven based on so-called line-inversion driving like that shown in FIGS. 18A and 18B for example. In FIGS. 18A and 18B, FIG. 18A shows the polarities of the pixel potentials for the sub-pixels SPix in a certain frame. FIG. 18B shows the polarities of the pixel potentials in the next frame. As shown in FIGS. 18A and 18B, in the line-inversion driving, the display unit 20 is so driven that, in a certain frame, the polarities of the pixel potentials of the sub-pixels SPix adjacent to each other along the row direction are identical to each other and the polarities of the pixel potentials of the sub-pixels SPix adjacent to each other along the column direction are different from each other. Furthermore, the polarities of the pixel potentials of all of the sub-pixels SPix are inverted on a frame-by-frame basis.

Other Modification Examples

In the above-described embodiment, the pixel signal Vsig is configured by time-division multiplexing of the pixel signals Vpix of three sub-pixels SPix. However, the configuration is not limited thereto. Instead of this, the pixel signals Vpix of four or more sub-pixels SPix or two sub-pixels SPix may be subjected to the time-division multiplexing for example. In this case, the number of switches in each switch group 17 of the selection switch unit 14 is set equal to the number of sub-pixels SPix as the multiplexing subject.

In the above-described embodiment, the source driver 13 supplies the pixel signal Vsig to the selection switch unit 14 and the selection switch unit 14 separates the pixel signals Vpix from the pixel signal Vsig and supplies the pixel signals Vpix to the display unit 20. However, the configuration is not limited thereto. Instead of this, the source driver may generate the pixel signals Vpix and supply them directly to the display unit 20 without the provision of the selection switch unit 14 for example.

2. Application Examples

With reference to FIG. 19 to FIG. 23G, application examples of the display device described for the above-described embodiment and modification examples will be described below. The display device of the above-described embodiment and so forth can be applied to electronic apparatus in every field, such as a television device, a digital camera, a notebook personal computer, a portable terminal device typified by a cellular phone, and a video camcorder. In other words, the display device of the above-described embodiment and so forth can be applied to electronic apparatus in every field that displays a video signal input from the external or a video signal generated inside as image or video.

Application Example 1

FIG. 19 shows the appearance of a television device to which the display device of the above-described embodiment and so forth is applied. This television device has e.g. a video display screen part 510 including a front panel 511 and a filter glass 512, and this video display screen part 510 is formed of the display device according to the above-described embodiment and so forth.

Application Example 2

Figure 20A:
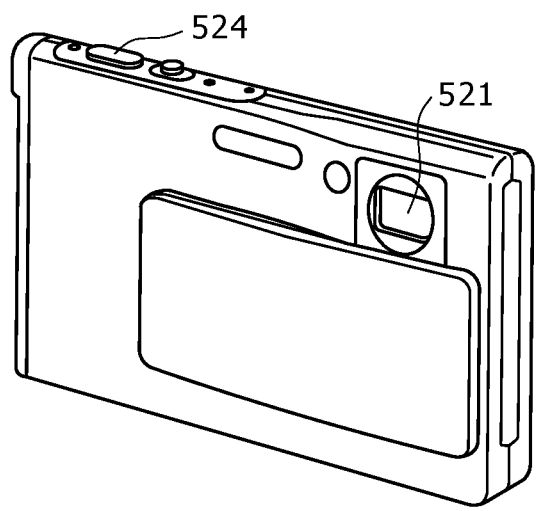
FIGS. 20A 20B are perspective views showing the appearance configuration of application example 2.
Figure 20B:
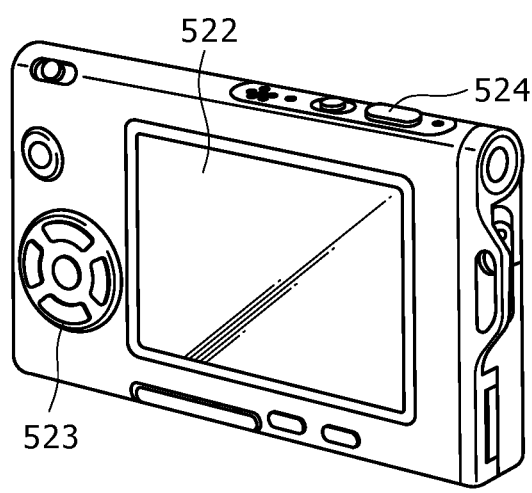

FIGS. 20A and 20B show the appearance of a digital camera to which the display device of the above-described embodiment and so forth is applied. This digital camera has e.g. a light emitter 521 for flash, a display part 522, a menu switch 523, and a shutter button 524, and this display part 522 is formed of the display device according to the above-described embodiment and so forth.

Application Example 3

Figure 21:
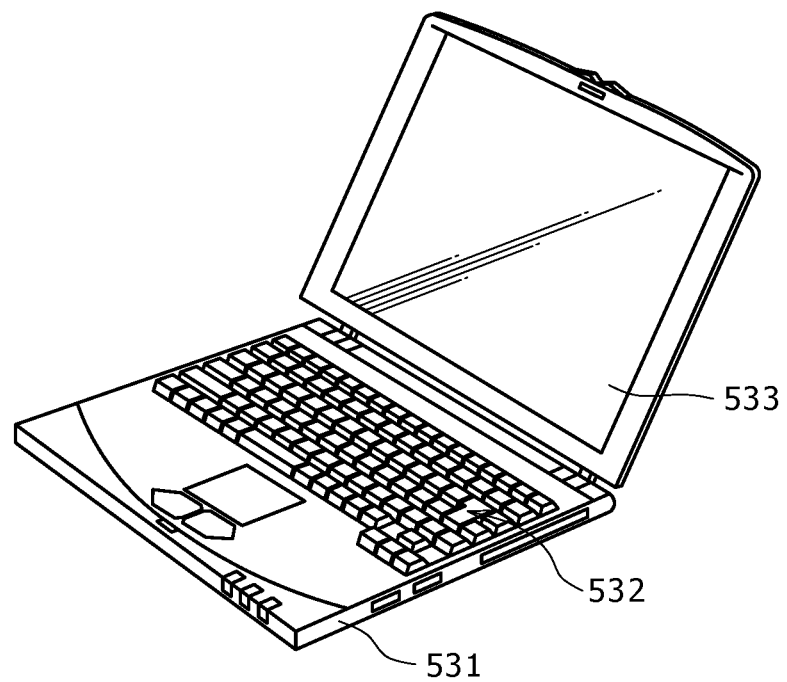
FIG. 21 is a perspective view showing the appearance configuration of application example 3.

FIG. 21 shows the appearance of a notebook personal computer to which the display device of the above-described embodiment and so forth is applied. This notebook personal computer has e.g. a main body 531, a keyboard 532 for input operation for characters, etc., and a display part 533 that displays images, and this display part 533 is formed of the display device according to the above-described embodiment and so forth.

Application Example 4

Figure 22:
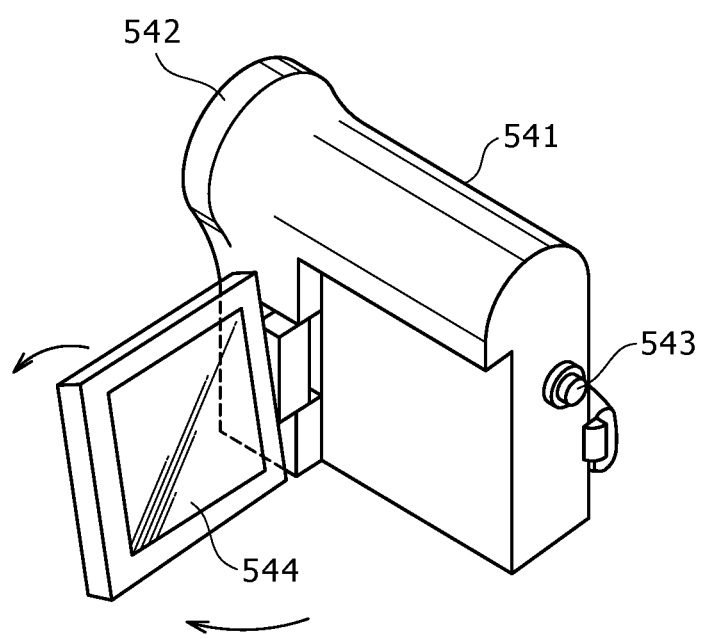
FIG. 22 is a perspective view showing the appearance configuration of application example 4.

FIG. 22 shows the appearance of a video camcorder to which the display device of the above-described embodiment and so forth is applied. This video camcorder has e.g. a main body part 541, a lens 542 that is provided on the front side of this main body part 541 and used for subject photographing, a start/stop switch 543 used in photographing, and a display part 544. This display part 544 is formed of the display device according to the above-described embodiment and so forth.

Application Example 5

FIGS. 23A to 23G show the appearance of a cellular phone to which the display device of the above-described embodiment and so forth is applied. For example, this cellular phone is formed by connecting an upper case 710 to a lower case 720 by a connecting part (hinge part) 730 and has a display 740, a sub-display 750, a picture light 760, and a camera 770. The display 740 or the sub-display 750 is formed of the display device according to the above-described embodiment and so forth.

The present disclosure has been described above by taking embodiment, modification examples, and examples of application to electronic apparatus. However, the present disclosure is not limited to the embodiment and so forth and various modifications are possible.

Figure 24:
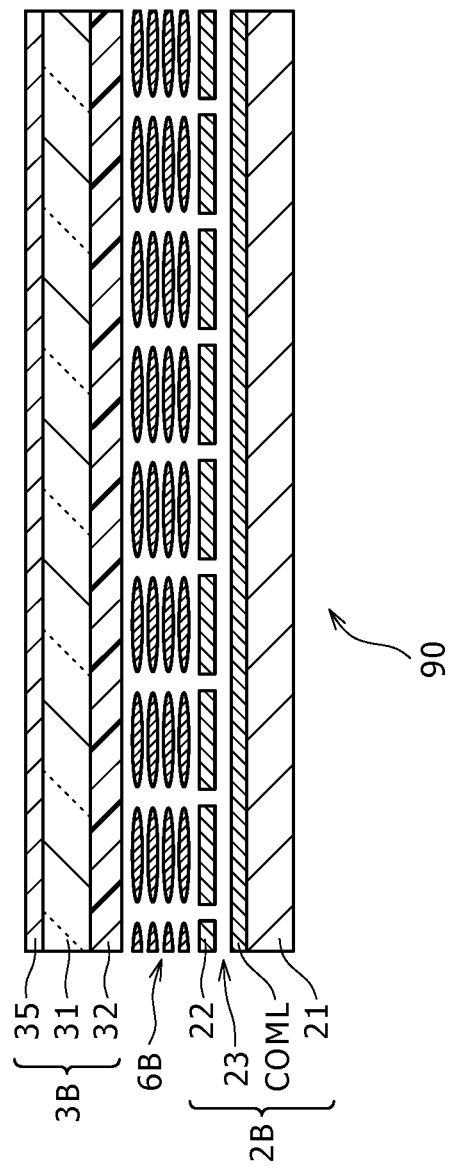
FIG. 24 is a sectional view showing the schematic sectional structure of the display unit according to another modification example.

For example, in the above-described embodiment and so forth, the display unit 20 is configured by using a liquid crystal of any of various kinds of modes such as TN, VA, and ECB modes. However, instead of this, a liquid crystal of a transverse electric field mode such as a fringe field switching (FFS) mode or an in-plane switching (IPS) mode may be used. For example, if a liquid crystal of the transverse electric field mode is used, a display unit 90 can be configured as shown in FIG. 24. FIG. 24 shows one example of the sectional structure of the major part of the display unit 90 and shows the state in which a liquid crystal layer 6B is interposed between a pixel substrate 2B and a counter substrate 3B. The names, functions, and so forth of the other respective components are the same as those in FIG. 3 and therefore description thereof is omitted. In this example, the common drive electrode COML is formed just on the TFT substrate 21 and forms part of the pixel substrate 2B differently from the case of FIG. 3. The pixel electrode 22 is disposed over the common drive electrode COML with the intermediary of an insulating layer 23.

For example, in the above-described embodiment and so forth, a liquid crystal display element is used as the display element. However, the configuration is not limited thereto. Instead of this, any display element such as an electro luminescence (EL) element may be used.

The present disclosure contains subject matter related to that disclosed in Japanese Priority Patent Application JP 2010-187222 filed in the Japan Patent Office on Aug. 24, 2010, the entire content of which is hereby incorporated by reference.

What is claimed is:

1. A display device comprising:
   a plurality of signal lines, each extending along a first direction;
   a plurality of common drive electrodes including a first common drive electrode and a second common drive electrode adjacent to the first common drive electrode in a second direction intersecting with the first direction;
   a plurality of display elements, each including a transistor coupled to a corresponding signal line, the plurality of display elements including a first display element corresponding to red color, a second display element corresponding to green color, and a third display element corresponding to blue color that are arranged in order of the second display element, the third display element, and the first display element in the second direction; and
   a plurality of drive electrode line parts including a first drive electrode line part coupled to the first common drive electrode and a second drive electrode line part coupled to the second common drive electrode,
   wherein the first common drive electrode is overlapped with the second display element and the third display element, and the second common drive electrode is overlapped with the first display element.

2. The display device according to claim 1,
   wherein a width of each of the common drive electrodes in the second direction corresponds to an integral multiple of a width of a set of the first display element, the second display element, and the third display element in the second direction.

3. The display device according to claim 1,
   wherein the plurality of signal lines include a first signal line corresponding to the first display element, and the first signal line is arranged between the first common drive electrode and the second common drive electrode.

4. The display device according to claim 1, further comprising a switch group including a first switch and a second switch,
   wherein the plurality of signal lines including a first signal line coupled to the first display element and a second signal line coupled to the second display element,
   wherein a first end of the first switch and a first end of the second switch are coupled to a same line, a second end of the first switch is coupled to the first signal line, and a second end of the second switch is coupled to the second signal line.

5. The display device according to claim 4,
   wherein the first switch and the second switch are operated at different timings.

6. The display device according to claim 1,
   wherein the signal lines overlapping with the first common drive electrode are equal in number to the signal lines overlapping with the second common drive electrode.

7. The display device according to claim 1,
   wherein each of the display elements is a liquid crystal display element.

8. The display device according to claim 1, further comprising:
   a plurality of drive electrode switches including a first drive electrode switch coupled to the first drive electrode line part and a second drive electrode switch coupled to the second drive electrode line part; and
   a drive electrode driver coupled to the plurality of the drive electrode switches.

9. The display device according to claim 8,
   wherein the first drive electrode switch and the second drive electrode switch are sequentially operated in a time-divisional manner.

10. The display device according to claim 8, further comprising a terminal part disposed at a side intersecting with the first direction,
    wherein the drive electrode driver is disposed at the side, and the drive electrode driver is supplied with a signal from the terminal part.

11. The display device according to claim 8, further comprising:
    a terminal part that is supplied with power;

a plurality of scan signal lines, each extending along the second direction; and a gate driver that supplies a scan signal to each of the scan signal lines, wherein the drive electrode driver is disposed at a position closer to the terminal part than the gate driver.

12. The display device according to claim 8, wherein the drive electrode driver supplies a first drive signal to the first drive electrode switch and supplies a second drive signal to the second drive electrode switch, and the first drive signal and the second drive signal have polarities opposite to each other.

13. The display device according to claim 1, further comprising a source driver coupled to a first signal line coupled to the first display element and a third signal line coupled to the third display element, wherein the source driver supplies a first pixel signal to the first signal line and supplies a third pixel signal to the third signal line, and the first pixel signal and the third pixel signal have polarities opposite to each other.

14. The display device according to claim 1, further comprising a source driver coupled to a second signal line coupled to the second display element and a third signal line coupled to the third display element, wherein the source driver supplies a second pixel signal to the second signal line and supplies a third pixel signal to the third signal line, and the second pixel signal and the third pixel signal have polarities opposite to each other.

15. The display device according to claim 1, further comprising a source driver coupled to the plurality of signal lines via a selection switch unit, wherein the source driver and the selection switch unit supply pixel signals with polarities opposite to each other to signal lines adjacent to each other.

16. The display device according to claim 1, wherein a dot-inversion driving is performed.

17. The display device according to claim 1, wherein the display elements include a fourth display element corresponding to red color and a fifth display element corresponding to blue color, wherein the second display element, the fourth display element, and the fifth display element are arranged in order of the fifth display element, the fourth display element, and the second display element in the second direction, and wherein the first common drive electrode is overlapped with the fourth display element and the fifth display element adjacent to the second common drive electrode in the second direction.

18. The display device according to claim 1, wherein the display elements include a sixth display element corresponding to blue color and a seventh display element corresponding to red color, wherein the sixth display element and the seventh display are arranged in order of the sixth display element and the seventh display in the second direction, wherein the common drive electrodes include a third common drive electrode, wherein the first common drive electrode is overlapped with the second display element and the third display element, and wherein the second common drive electrode is overlapped with the sixth display element, and the third common drive electrode is overlapped with the seventh display element.

19. A display device comprising:

a plurality of signal lines, each extending along a first direction;

a plurality of common drive electrodes including a first common drive electrode and a second common drive electrode adjacent to the first common drive electrode in a second direction intersecting with the first direction;

a plurality of display elements including a first display element corresponding to red color, a second display element corresponding to green color, and a third display element corresponding to blue color that are arranged in order of the second display element, the third display element, and the first display element in the second direction; and a plurality of drive electrode line parts including a first drive electrode line part coupled to the first common drive electrode and a second drive electrode line part coupled to the second common drive electrode, wherein the plurality of signal lines include a second signal line corresponding to the second display element and a third signal line corresponding to the third display element, and the second and third signal lines are overlapped with the first common drive electrode, and wherein the plurality of signal lines include a first signal line corresponding to the first display element, and the first signal line is arranged between the first common drive electrode and the second common drive electrode.

20. An electronic apparatus comprising:

a display device;

a controller configured to control operation carried out by utilizing the display device, wherein the display device includes:

a plurality of signal lines, each extending along a first direction;

a plurality of common drive electrodes including a first common drive electrode and a second common drive electrode adjacent to the first common drive electrode in a second direction intersecting with the first direction;

a plurality of display elements including a first display element corresponding to red color, a second display element corresponding to green color, and a third display element corresponding to blue color that are arranged in order of the second display element, the third display element, and the first display element in the second direction; and a plurality of drive electrode line parts including a first drive electrode line part coupled to the first common drive electrode and a second drive electrode line part coupled to the second common drive electrode, wherein the first common drive electrode is overlapped with the second display element and the third display element, and the second common drive electrode is overlapped with the first display element.

* * * * *